United States Patent
Kang et al.

(10) Patent No.: US 9,495,094 B2
(45) Date of Patent: Nov. 15, 2016

(54) METHOD AND APPARATUS FOR INPUTTING USER COMMANDS USING RELATIVE MOVEMENTS OF DEVICE PANELS

(75) Inventors: Kyung-A Kang, Seoul (KR); Ji-Yeon Kwak, Seoul (KR); Hyun-Jin Kim, Seoul (KR); Joon-Kyu Seo, Gyeonggi-do (KR); Ju-Youn Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 222 days.

(21) Appl. No.: 13/371,023

(22) Filed: Feb. 10, 2012

(65) Prior Publication Data

US 2012/0299813 A1 Nov. 29, 2012

Related U.S. Application Data

(60) Provisional application No. 61/441,491, filed on Feb. 10, 2011.

(30) Foreign Application Priority Data

Jun. 27, 2011 (KR) .................. 10-2011-0062553

(51) Int. Cl.
*G09G 5/00* (2006.01)
*G06F 3/0488* (2013.01)
(Continued)

(52) U.S. Cl.
CPC ......... *G06F 3/04883* (2013.01); *G06F 1/1641* (2013.01); *G06F 1/1643* (2013.01); *G06F 1/1647* (2013.01); *G06F 1/1677* (2013.01); *G06F 3/0485* (2013.01); *G06F 3/0486* (2013.01); *G06F 3/04845* (2013.01); *G06F 3/04847* (2013.01); *G06F 3/1423* (2013.01);

*G06F 2203/04806* (2013.01); *G09G 2340/0492* (2013.01); *G09G 2380/14* (2013.01); *G09G 2380/16* (2013.01)

(58) Field of Classification Search
None
See application file for complete search history.

(56) References Cited

U.S. PATENT DOCUMENTS 7,197,332 B2   3/2007   Andersson et al.
8,049,687 B2   11/2011  Kim
(Continued)

FOREIGN PATENT DOCUMENTS

CN   101788850   7/2010
CN   101893914   11/2010
(Continued)

OTHER PUBLICATIONS

Chinese Office Action dated Jul. 30, 2015 issued in counterpart application No. 201280008554.5, 18 pages.

*Primary Examiner* — Seokyun Moon
*Assistant Examiner* — Douglas M Wilson
(74) *Attorney, Agent, or Firm* — The Farrell Law Firm, P.C.

(57) ABSTRACT

A method and apparatus for inputting various operation instructions to a device including two movable panels. The method includes determining whether a relative angle between the first panel and the second panel is within an effective angle range; determining whether the relative angle within the effective angle range is maintained during an effective time; and inputting an operation instruction to the device based on whether the relative angle between the first panel and the second panel is within the effective angle range and whether the relative angle within the effective angle range is maintained during the effective time.

34 Claims, 24 Drawing Sheets

(51) Int. Cl.

*G06F 1/16* (2006.01)
*G06F 3/0484* (2013.01)
*G06F 3/0485* (2013.01)
*G06F 3/0486* (2013.01)
*G06F 3/14* (2006.01)

(56) References Cited

U.S. PATENT DOCUMENTS

| | | |
|---|---|---|
| 2004/0244146 A1 | 12/2004 | Park |
| 2007/0222774 A1 | 9/2007 | Foster |
| 2008/0042984 A1 | 2/2008 | Lim et al. |
| 2010/0064536 A1* | 3/2010 | Caskey ................ G06F 1/1616 33/303 |
| 2010/0134412 A1* | 6/2010 | Narita ................... G06F 1/1616 345/156 |
| 2010/0182265 A1 | 7/2010 | Kim et al. |
| 2010/0182665 A1 | 7/2010 | Oovey |
| 2010/0298032 A1* | 11/2010 | Lee ....................... G06F 1/1616 455/566 |
| 2010/0302179 A1 | 12/2010 | Ahn et al. |

FOREIGN PATENT DOCUMENTS

| | | |
|---|---|---|
| EP | 2 207 076 | 7/2010 |
| JP | 2004-117441 | 4/2004 |
| JP | 2008033686 | 2/2008 |
| JP | 2009-217415 | 9/2009 |
| KR | 1020060086923 | 8/2006 |
| KR | 1020090113562 | 11/2009 |
| KR | 1020100128781 | 12/2010 |
| WO | WO 2010/028402 | 3/2010 |

* cited by examiner

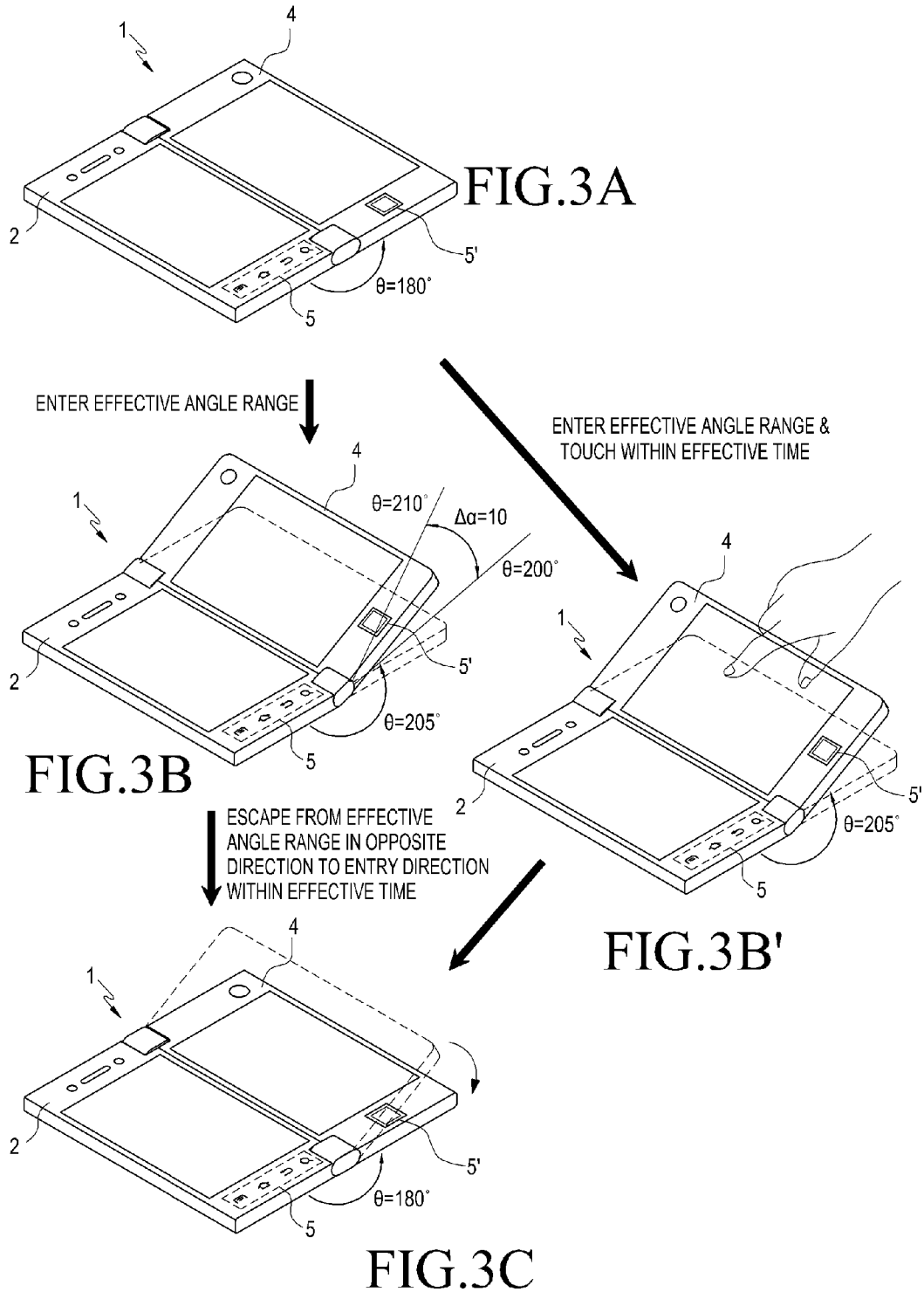

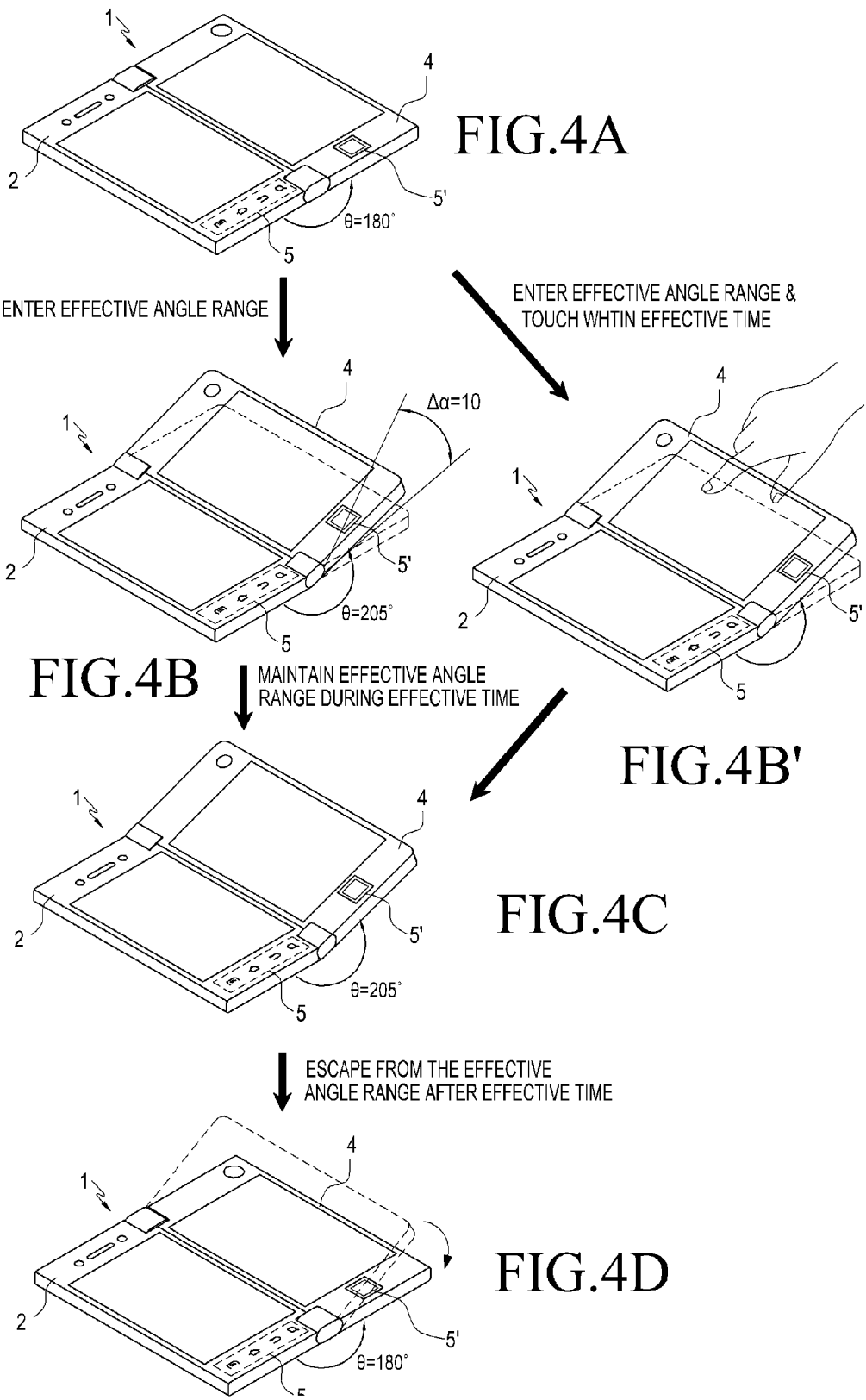

| | FOLDING BACK INSTRUCTION | | FOLDING HOLD INSTRUCTION | |
|---|---|---|---|---|
| | FOLDING BACK INSTRUCTION | FOLDING BACK COMBINATION INSTRUCTION | FOLDING HOLD ONLY INSTRUCTION | FOLDING HOLD COMBINATION INSTRUCTION |
| FIRST PANEL MOVEMENT | 12a FOLDING BACK INSTRUCTION | 13a CHANGE TO PREVIOUS TASK AMONG EXECUTED MULTITASK (TERMINATE CURRENTLY EXECUTED APPLICATION) | 14a CONTINUOUSLY CHANGE TO PREVIOUS TASK AMONG EXECUTED MULTITASK (CURRENTLY EXECUTED APPLICATION ENTERS TASK MANAGER) | 15a CHANGE E-BOOK CHAPTER<br><br>Δα1 : CHANGE TO NEXT CHAPTER<br>-Δα1 : CHANGE TO PREVIOUS CHAPTER |
| SECOND PANEL MOVEMENT | 12b FOLDING BACK ONLY INSTRUCTION | 13b AUTOMATICALLY PASTE LATEST CONTENTS IN CLIPBOARD | 14b PAGE TURNING EFFECT IN E-BOOK<br>..<br>Δα2 : TURN PAGE TO NEXT PAGE (x2)<br>Δα1 : TURN PAGE TO NEXT PAGE (x1)<br>-Δα1 : TURN PAGE TO PREVIOUS PAGE (x1)<br>-Δα2 : TURN PAGE TO PREVIOUS PAGE (x2) | 15b SET DETAILED PAGE OF E-BOOK |
| FIRST PANEL & SECOND PANEL MOVEMENTS | 12c CAPTURE CURRENT SCREEN | 13c ENLARGE/REDUCE SCREEN<br>..<br>Δα2 : ENLARGE CURRENT SCREEN 4 TIMES<br>Δα1 : ENLARGE CURRENT SCREEN 2 TIMES<br>-Δα1 : REDUCE CURRENT SCREEN 1/2 TIMES<br>-Δα2 : REDUCE CURRENT SCREEN 1/4 TIMES | 14c SUCCESSIVE SCREEN ZOOM-IN/ZOOM-OUT<br>..<br>Δα2 : SCREEN ZOOM-IN (x2)<br>Δα1 : SCREEN ZOOM-IN (x1)<br>-Δα1 : SCREEN ZOOM-OUT (x1)<br>-Δα2 : SCREEN ZOOM-OUT (x2) | 15c CHANGE TO ANOTHER BOOK IN E-BOOK<br><br>Δα1 : CHANGE TO NEXT BOOK OF LIST<br>-Δα1 : CHANGE TO PREVIOUS BOOK OF LIST |

FIG.11

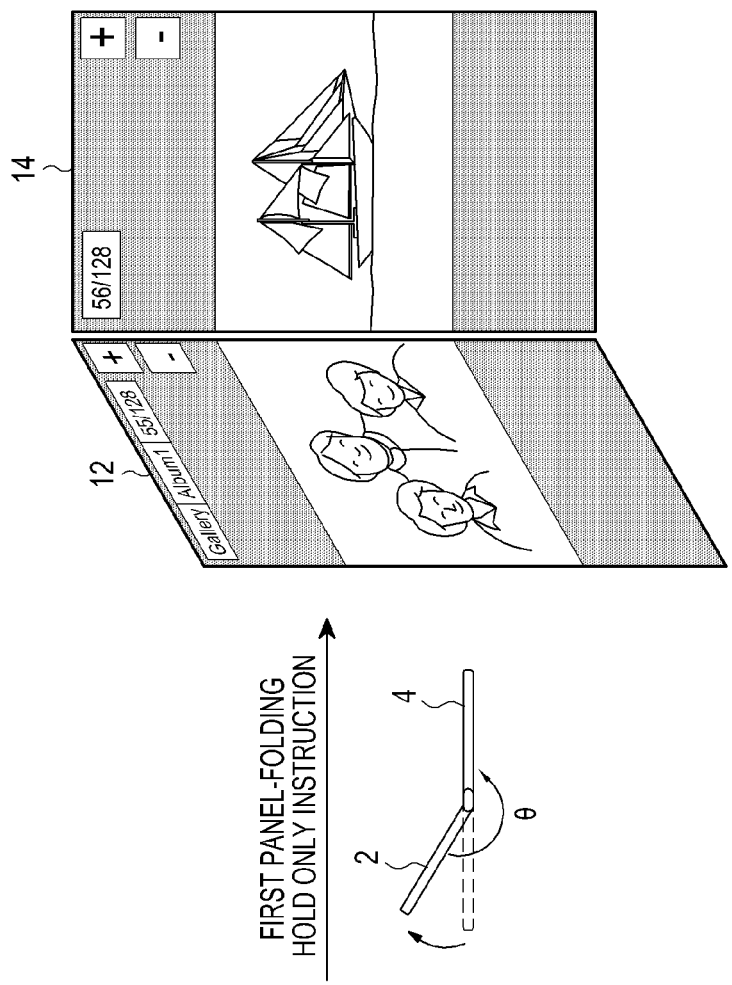
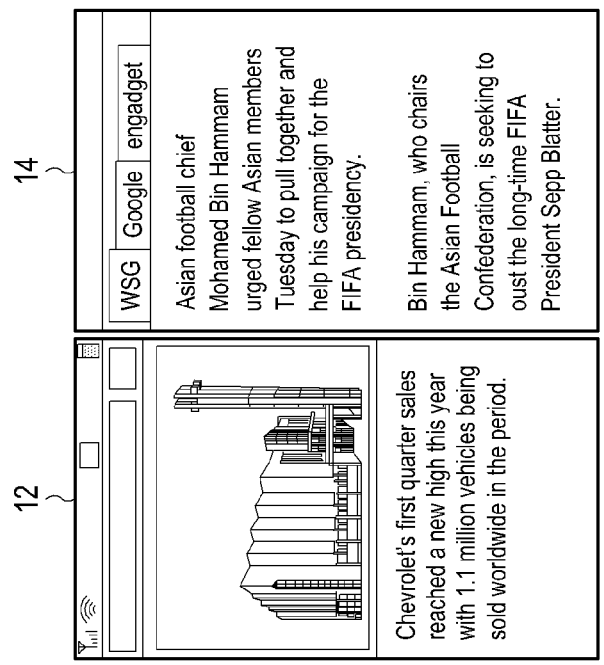
FIG.14A

| | FOLDING BACK INSTRUCTION | | FOLDING HOLD INSTRUCTION | |
|---|---|---|---|---|
| | FOLDING BACK COMBINATION INSTRUCTION | FOLDING BACK ONLY INSTRUCTION | FOLDING HOLD ONLY INSTRUCTION | FOLDING HOLD COMBINATION INSTRUCTION |
| FIRST PANEL MOVEMENT | CHANGE TO PREVIOUS TASK AMONG EXECUTED MULTITASK (TERMINATE CURRENTLY EXECUTED APPLICATION) | | CONTINUOUSLY CHANGE TO PREVIOUS TASK AMONG EXECUTED MULTITASK (CURRENTLY EXECUTED APPLICATION ENTERS TASK MANAGER) | SHOW HISTORY (OPENED PAGE) IN WEB BROWSER |
| SECOND PANEL MOVEMENT | | AUTOMATICALLY PASTE LATEST CONTENTS IN CLIPBOARD | PAGE TURNING EFFECT IN E-BOOK <br> ∴ <br> Δα2 : TURN PAGE TO NEXT PAGE (x2) <br> Δα1 : TURN PAGE TO NEXT PAGE (x1) <br> -Δα1 : TURN PAGE TO PREVIOUS PAGE (x1) <br> -Δα2 : TURN PAGE TO PREVIOUS PAGE (x2) <br> ∴ | SHOW MEDIA PLAYER CHANNEL/LIST |
| FIRST PANEL & SECOND PANEL MOVEMENTS | CAPTURE CURRENT SCREEN | ENLARGE/REDUCE SCREEN <br> ∴ <br> Δα2 : ENLARGE CURRENT SCREEN 4 TIMES <br> Δα1 : ENLARGE CURRENT SCREEN 2 TIMES <br> -Δα1 : REDUCE CURRENT SCREEN 1/2 TIMES <br> -Δα2 : REDUCE CURRENT SCREEN 1/4 TIMES <br> ∴ | SUCCESSIVE SCREEN ZOOM-IN/ZOOM-OUT <br> ∴ <br> Δα2 : SCREEN ZOOM-IN (x2) <br> Δα1 : SCREEN ZOOM-IN (x1) <br> -Δα1 : SCREEN ZOOM-IN (x1) <br> -Δα2 : SCREEN ZOOM-OUT (x2) <br> ∴ | SHOW BOOKMARK (FAVORITE) IN WEB BROWSER |

FIG.16

METHOD AND APPARATUS FOR INPUTTING USER COMMANDS USING RELATIVE MOVEMENTS OF DEVICE PANELS

This application claims priority under 35 U.S.C. §119 to U.S. Provisional Application Ser. No. 61/441,491, which was filed in the U.S. Patent and Trademark Office on Feb. 10, 2011, and Korean Patent Application Serial No. 10-2011-0062553, which was filed in the Korean Industrial Property Office on Jun. 27, 2011, the content of each of which is incorporated herein by reference.

BACKGROUND OF THE INVENTION

1. Field of the Invention

The present invention relates generally to a method and apparatus for inputting user commands to a device including at least two relatively movable panels, and more particularly, to a method and apparatus for inputting user commands based on a relative angle of the at least two panels entering an effective angle range, a retention time of the relative angle within the effective angle range, and whether the relative angle leaves the effective angle range.

2. Description of the Related Art

In a device with two panels, such as a notebook, an electronic book, a foldable portable terminal, etc., a relative angle between the two panels is detected using a hinge of the device and then a user interface is provided based on the detected relative angle.

For example, Japanese Patent Publication No. 2008-33686 describes an electronic book of which a page is turned according to a changed relative angle when a user changes the relative angle between two panels, without execution of a function button or a menu for a previous page or a next page in the electronic book. Further, U.S. Patent Publication No. 2010/0182265 describes a portable terminal, which recognizes a relative angle between connected panels using a hinge and then provides applications most frequently executed in the recognized relative angle.

However, in the conventional art, the provided user interface is for executing one function according to a set relative angle between the two panels, and only provides a simple interface.

SUMMARY OF THE INVENTION

Accordingly, the present invention is designed to address at least the problems and/or disadvantages described above and to provide at least the advantages described below.

An aspect of the present invention is to provide an apparatus and a method for providing a user interface that allows a user using a device including two panels to more conveniently and variously execute diverse applications or functions in the device.

Another aspect of the present invention is to provide an apparatus and a method for inputting various command inputs using a combination of various conditions such as a preset effective angle range between the two panels, a retention time within the effective angle range, existence of an additional input by a user, and an escape of the relative angle from the effective angle range.

In accordance with an aspect of the present invention, a method is provided for inputting an operation instruction in a device including a first panel and a second panel. The method includes determining whether a relative angle between the first panel and the second panel is within an effective angle range; determining whether the relative angle within the effective angle range is maintained during an effective time; and inputting an operation instruction to the device based on whether the relative angle between the first panel and the second panel is within the effective angle range and whether the relative angle within the effective angle range is maintained during the effective time.

In accordance with another aspect of the present invention, a method is provided for inputting a folding back instruction in a device including a first panel and a second panel. The method includes determining when a relative angle between the first panel and the second panel moves into an effective angle range; determining when the relative angle between the first panel and the second panel moves out of the effective angle range in an opposite direction to an entry direction to the effective angle range, within a predetermined time after the relative angle enters the effective angle range; and inputting the folding back instruction based on the relative angle between the first panel and the second panel moving out of the effective angle range in the opposite direction within the predetermined time.

In accordance with another aspect of the present invention, a method is provided for inputting a folding back instruction in a device including a first panel and a second panel. The method includes determining when at least one of the first panel and the second panel are moved in a first direction, such that a relative angle between the first panel and the second panel is changed; determining when one or more panels of the first panel and the second panel are moved in a second direct, opposite to the first direction, such that the relative angle between the two panels is changed in the second direction; and inputting the folding back instruction based on the at lest one of the first panel and the second panel being moved in the first direction and then moved in the second direction.

In accordance with another aspect of the present invention, an apparatus is provided for inputting an operation instruction. The apparatus includes a first panel; a second panel hingedly connected to the first panel; an angle sensor for detecting a relative angle between the first panel and the second panel; and a controller for determining an input of the operation instruction based on whether the relative angle between the first panel and the second panel is within an effective angle range, and whether the relative angle is maintained within the effective angle range for an effective time.

In accordance with another aspect of the present invention, an apparatus is provided for inputting an operation instruction. The apparatus includes a first panel; a second panel hingedly connected to the first panel; an angle sensor for detecting a relative angle between the first panel and the second panel; and a controller for detecting a change of the relative angle between the first panel and the second panel to determine an input of the operation instruction. The controller determines that a folding back instruction is input when the relative angle between the first panel and the second panel moves out of an effective angle range in an opposite direction to an entry direction into the effective angle range within a predetermined time after the relative angle enters the effective angle range.

In accordance with another aspect of the present invention, an apparatus is provided for inputting an operation instruction. The apparatus includes a first panel; a second panel hingedly connected to the first panel; an angle sensor for detecting a relative angle between the first panel and the second panel; and a controller for detecting a change of the relative angle between the first panel and the second panel to determine an input of the operation instruction. The controller determines that a folding back instruction is input when the relative angle between the first panel and the second panel is changed in a first direction and the relative angle is changed in a second direction, opposite to the first direction, within a predetermined time.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 3A to 3C illustrate a method of inputting a folding back instruction according to an embodiment of the present invention;

FIGS. 4A to 4D illustrate a method of inputting a folding hold instruction according to an embodiment of the present invention;

FIG. 11 illustrates function mapping to each instruction input according to an embodiment of the present invention;

FIGS. 14A to 14C illustrates a folding hold only instruction based on which of the panels is moved, according to an embodiment of the present invention;

FIG. 16 illustrates function mapping to an instruction input according to an embodiment of the present invention.

DETAILED DESCRIPTION OF EMBODIMENTS OF THE INVENTION

Figure 1:
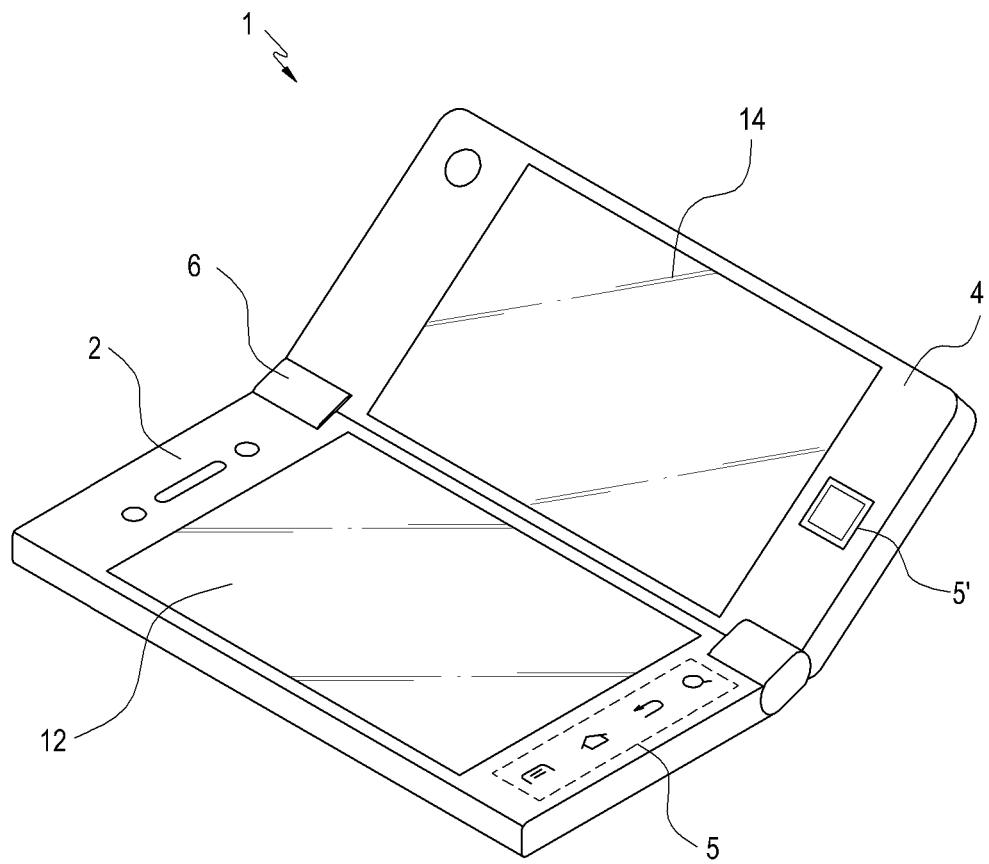
FIG. 1 illustrates a device including a first panel and a second panel according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Additionally, in the following description, the same elements will be designated by the same reference numerals although they are shown in different drawings.

FIG. 1 illustrates a device including a first panel and a second panel according to an embodiment of the present invention.

Referring to FIG. 1, the device 1 includes a first panel 2 and a second panel 4. The first panel 2 and the second panel 4 are coupled with each by a hinge 6, to open and close from and to each other. For example, the device may be a mobile phone, a notebook, a tablet Personal Computer (PC), and a Portable Media Player (PMP).

The first panel 2 includes a first screen 12 and a function button 5. The second panel 4 includes a second screen 14 and a function button 5'.

Although FIG. 1 illustrates the first screen 12 and the second screen 14 formed in the first panel 2 and the second panel 4, respectively, the present invention is also applicable to a device in which a screen is formed in only one of the two panels.

Further, when user instruction can be directly input to a screen, e.g., using a touch screen, the function buttons 5 and 5' may be omitted.

Additionally, although the present invention describes the hinge 6 as an example of connecting the first panel 2 and the second panel 4, the hinge 6 can be replaced with another element that enables the relative movement of the first panel 2 and the second panel 4.

FIGS. 2A to 2D illustrate various relative angle states of a first panel and a second panel of a device according to an embodiment of the present invention. Specifically, FIGS. 2A to 2D illustrate various relative angle states of the first panel 2 and the second panel 4 of the device 1 illustrated in FIG. 1.

A relative angle θ refers to a rotation angle of the second panel 4 rotated in a counterclockwise direction with respect to the first panel 2.

Figure 2A:
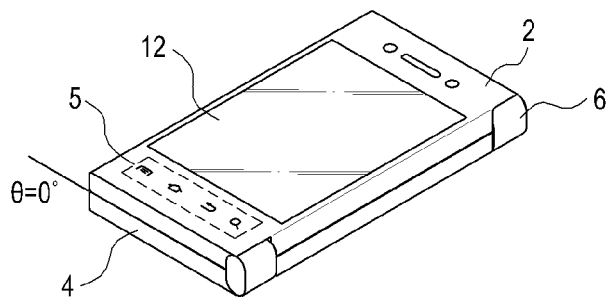
FIGS. 2A to 2D illustrate various relative angle states of a first panel and a second panel of a device according to an embodiment of the present invention.

Referring to FIG. 2A, i.e., a perspective view of the folded device 1, the first panel 2 and the second panel 4 are in contact with each other while each of the two screens 12 and 14 of the first panel 2 and the second panel 4 faces outward. In FIG. 2A, the relative angle θ is 0°.

Figure 2B:
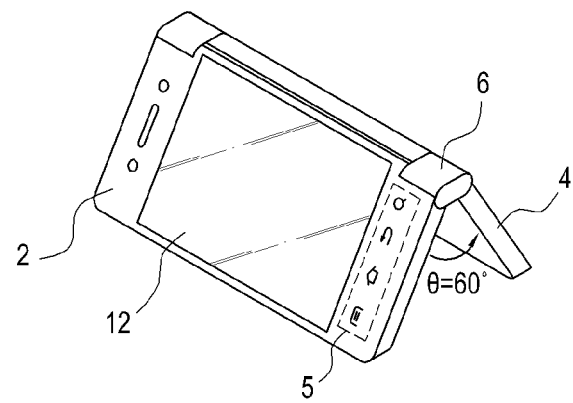

Referring to FIG. 2B, where the relative angle θ of the second panel 4 with respect to the first panel 2 is 60°, the two screens 12 and 14 are disposed facing outward. For example, this orientation may be useful for two players to play a game facing each other.

Figure 2C:
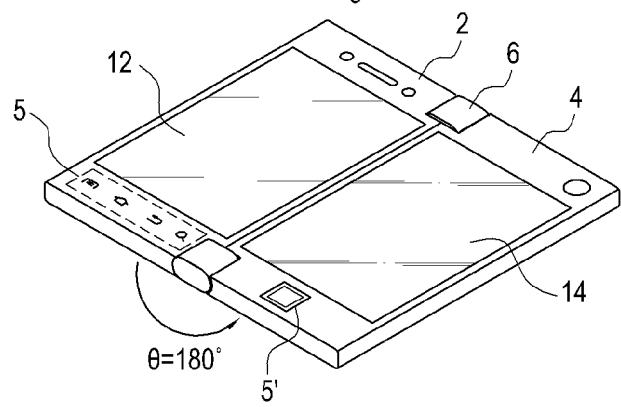

Referring to FIG. 2C, where the first panel 2 and the second panel 4 are arranged in parallel and the relative angle θ is 180°.

Figure 2D:
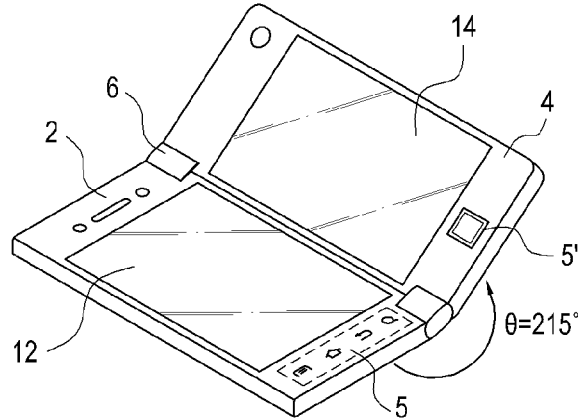

Referring to FIG. 2D, where the relative angle θ of the second panel 4 with respect to the first panel 2 is 215°, the two screens 12 and 14 are slightly folded inwardly.

FIGS. 3A to 3C illustrate a method of inputting a folding back instruction according to an embodiment of the present invention.

Referring to FIGS. 3A to 3C, the folding back instruction refers to a method in which a predetermined function is executed in a device including two panels, when the two panels are folded within an effective angle range and then unfolded within an effective time.

More specifically, FIG. 3A illustrates the device 1 before the folding back instruction is input. Although FIG. 3A illustrates the method beginning with a relative angle θ is 180°, other relative angles can be used.

When a user desires to input the folding back instruction in FIG. 3A, the second panel 4 is moved to have a certain relative angle (for example, 205°) within an effective angle range [Δα=a relative angle θ range is within 200° to 210°] as illustrated in FIG. 3B. Thereafter, the second panel 4 is moved in a direction opposite to the entry direction to the effective angle range within the effective time (for example, one second), such that the second panel 4 moves out of the effective angle range, as illustrated in FIG. 3C. Through a series of processes, the folding back instruction of the interface method according to the present invention is input to the device 1, and the device 1 executes a function according to the folding back instruction.

The folding back instruction is input as long as a relative angle between the two panels moves out of the effective angle range, while the second panel is moved in the direction opposite to the entry direction to the effective angle range with the effective time.

Although FIG. 3C illustrates the second panel 4 being returned to the original position illustrated in FIG. 3A, where the relative angle θ is 180°, it is not necessary for the second panel 4 to be returned to the original position. That is, the folding back instruction is input when the second panel 4 is moved to have a relative angle θ smaller than an angle of 200°.

Further, although FIGS. 3A to 3C illustrate the second panel 4 being moved in the direction opposite to the entry direction to the effective angle range, the folding back instruction may be input when the first panel 2, instead of the second panel 4, is moved downwardly from the structure shown in FIG. 3B so that a relative angle between the first panel 2 and the second panel 4 has a certain angle smaller than 200°. That is, the folding back instruction according to the present invention is input as long as any panel of the first panel 2 and the second panel 4 is moved such that a relative angle between the first panel 2 and the second panel 4 enters the effective angle range and then moves out of the effective angle range in a direction opposite to the entry direction to the effective angle range.

Herein, the effective angle range refers to a relative angle range between two panels, which may be preset by a manufacturer or set by a user. Accordingly, the above-described embodiments of the present invention are not limited to a angle range of 10° of an effective angle range set between 200° and 210° and the effective angle range can be set to various ranges.

Further, an effective time refers to a time interval, e.g., preset by a manufacturer, in order to recognize the folding back instruction, and is calculated from a time point where a relative angle between two panels enters the effective angle range.

In accordance with an embodiment of the present invention, the effective time corresponds to the time spent when a user unfolds the two panels within the effective angle range after the user folds the two panels. For example, the effective time may be set to one second, but may also be set to different values.

In accordance with another embodiment of the present invention, a folding back instruction may be input without the concept of the effective angle range. That is, it is possible to input the folding back instruction according to the present invention is input merely when a relative angle between the two panels is changed through a movement of one or more panels of the two panels in one direction and then the relative angle between the two panels is changed through a movement of one or more panels of the two panels in a direction opposite to the one direction.

Additionally, a folding back instruction may be subdivided based on an additional input by a user.

More specifically, referring to FIG. 3B', when the user makes an additional input such as touching a screen or pressing function button 5 or 5', while moving the second panel 4 in a direction opposite to an entry direction to the effective angle range, after the user moves the second panel 4 within the effective angle range Δα, the device 1 recognizes a folding back instruction executing a different function from the aforementioned folding back instruction. That is, the folding back instruction, which is input through unfolding of the two panels after the two panels are folded, is divided into a folding back only instruction (FIG. 3A→FIG. 3B→FIG. 3C) having no additional input by a user within the effective time, and a folding back combination instruction (FIG. 3A→FIG. 3B' →FIG. 3C) having an additional input (e.g., a touch on a touch screen or a function button press) by a user within the effective time. Accordingly, it is possible to divisibly input the folding back instruction through a setting in which the folding back only instruction and the folding back combination instruction execute different functions.

FIGS. 4A to 4D illustrate a method of inputting a folding hold instruction according to an embodiment of the present invention. Specifically, the folding hold instruction allows a predetermined function to be executed in the device through a retention of folded two panels for an effective time, after the two panels are folded within an effective angle range. For example, the folding hold instruction can be set to execute functions performing successive operations, for example, a zoom in/out function, a quick playback function, and a rewind function Referring to FIG. 4A, before the folding hold instruction is input, a relative angle θ is 180°, but the relative angle can be any angle. Again, although FIG. 4A illustrates the method beginning with a relative angle θ is 180°, other relative angles can be used.

When a user desires to execute the folding hold instruction in FIG. 4A, the user moves the second panel 4 to a certain relative angle (e.g., 205°) within the effective angle range [Δα=a relative angle θ range between 200° to 210°], as illustrated in FIG. 4B. Further, as illustrated in FIG. 4C, when the effective angle range is maintained for the effective time, the device 1 executes a function according to the folding hold instruction.

As described above, the effective angle range and the effective time may be preset by a manufacturer or set by a user.

Further, the folding hold instruction may be subdivided according to the existence of an additional input by the user like the folding back instruction.

More specifically, as illustrated in FIG. 4B', when the user moves the second panel 4 to the effective angle range Δα and then makes an additional input such as touching a screen or pressing function button 5 or 5' while maintaining the effective angle range for the effective time, a folding hold instruction executing a different function from the above-described folding hold instruction may be input. That is, the folding hold instruction in which two panels are maintained within the effective angle range for the effective time is divided into a folding hold only instruction (FIG. 4A→FIG. 4B→FIG. 4C) having no additional input by the user within the effective time, and a folding hold combination instruction (FIG. 4A→FIG. 4B' →FIG. 4C) having an additional input by the user within the effective time. The divided folding hold instruction can be input by setting the folding hold only instruction and the folding hold combination instruction to execute different functions.

When an input folding hold instruction (including both of the folding hold only instruction and the folding hold combination instruction) is executed, the device may be constructed such that the function, which is being executed, is stopped if the relative angle moves out of the effective angle range, e.g., due to a movement of the second panel 4, as illustrated in FIG. 4D. Here, moving out of the relative angle between two panels stops the function, which is being executed, regardless of the entry direction to the effective angle range once the relative angle moves out of the effective angle range in any direction.

Figure 5A:
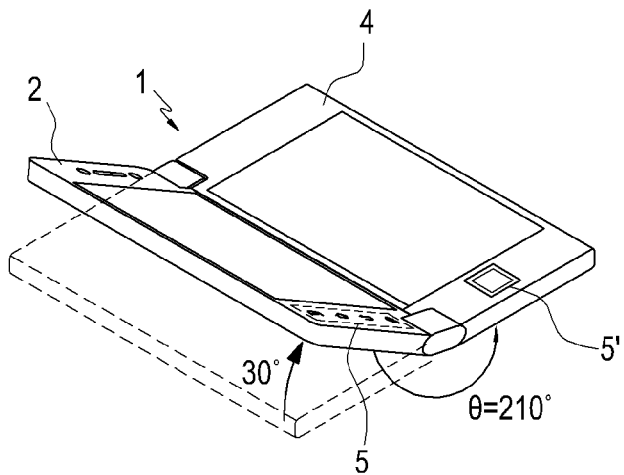
FIGS. 5A to 5C illustrate a method of subdividing input instructions according which of the panels is moved, according to an embodiment of the present invention.
Figure 5B:
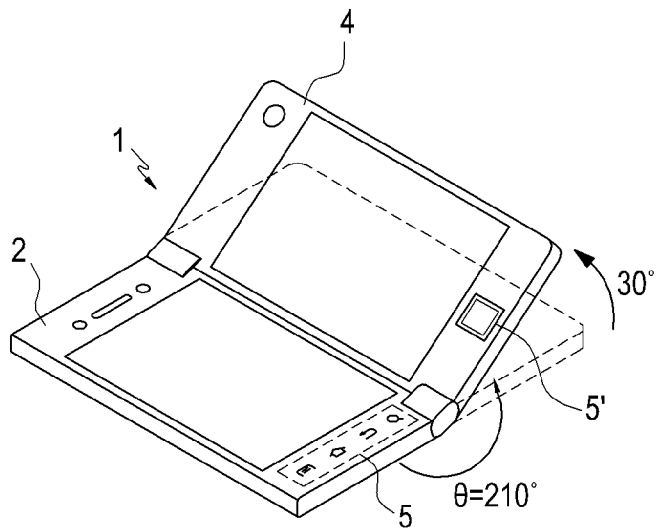
Figure 5C:
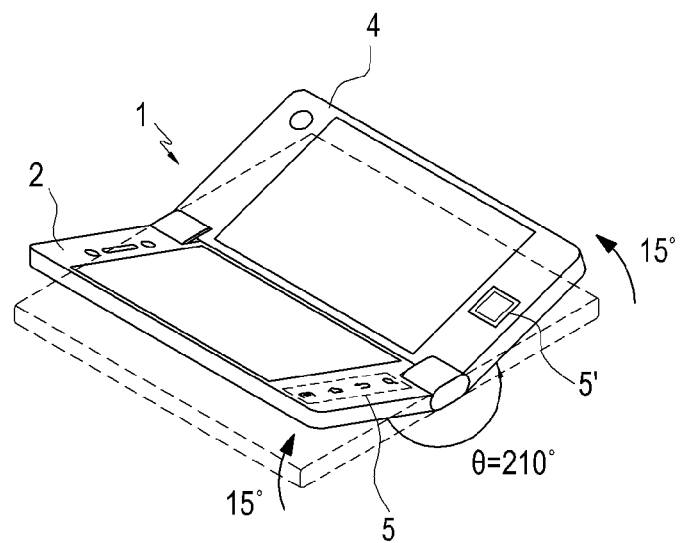

FIGS. 5A to 5C illustrate a method of subdividing input instructions according to which of the panels is moved, according to an embodiment of the present invention. Specifically, FIG. 5A illustrates the first panel 2 being moved, FIG. 5B illustrates the second panel 4 being moved, and FIG. 5C illustrates both the first panel 2 and the second panel 4 being moved.

Referring to FIG. 5A, when a relative angle θ between the two panels 2 and 4 is initially 180°, the first panel 2 is moved by 30° in a clockwise direction in order to make the relative angle θ enter the effective angle range of 210°, so that the relative angle θ becomes 210°.

Further, as illustrated in FIG. 5B, the second panel 4 is moved by 30° in a counterclockwise direction so that the relative angle θ may become 210°.

As illustrated in FIG. 5C, the first panel 2 and the second panel 4 are moved by 15° in a clockwise direction and a counterclockwise direction, respectively, so that the relative angle θ between the first panel 2 and the second panel 4 may become 210°. Here, changed angles of the first panel 2 and the second panel 4 do not have to be the same. That is, the first panel 2 may be moved by 10° in a clockwise direction and the second panel 4 may be moved by 20° in a counterclockwise direction. Further, the first panel 2 may be moved by −10° in a counterclockwise direction and the second panel 4 may be moved by 40° in a clockwise direction.

As described above, by subdividing input instructions according to which of the panels is moved, i.e., 3 different movements, it is possible to input three different instructions executing different functions according to which of the panels is moved.

Figure 6:
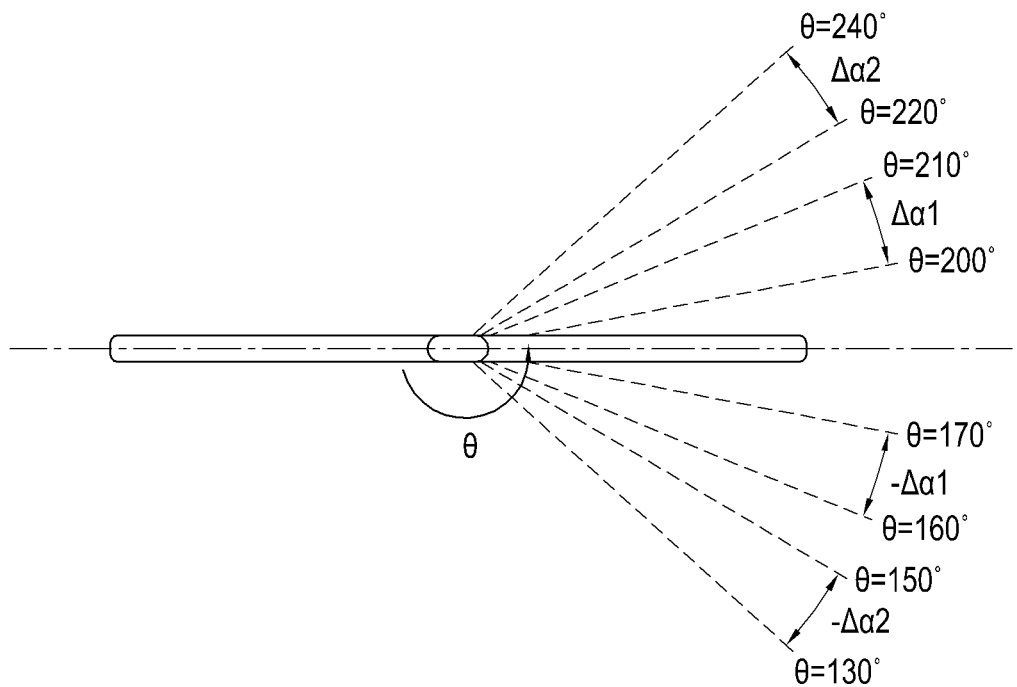
FIG. 6 illustrates effective angle ranges, which can be set as a plurality of ranges, according to an embodiment of the present invention.

FIG. 6 illustrates effective angle ranges, which can be set as a plurality of ranges, according to an embodiment of the present invention.

Referring to FIG. 6, the effective angle range may be set have a plurality of effective angle ranges. For example, the effective angle range of the relative angle θ may be set to a range of 220° to 240° (Δα2).

Specifically, the effective angle range is set to have a plurality of effective angle ranges (±Δα1, +Δα2 . . . ) and different functions may be executed for each effective angle range. Although FIG. 6 illustrates each of the effective angle ranges being set to 10°, each of these ranges may be set different values. The setting of the plurality of effective angle ranges may be specifically provided by a manufacturer, or provided by a user such that the user can directly set a plurality of effective angle ranges.

In setting the effective angle range, it is preferred that relative angles between the first panel 2 and the second panel 4 of 0°, 60°, 180°, and 215° corresponding to frequently used relative angles in the device 1, as illustrated in FIG. 2, are not included in the effective angle range in order to prevent movement of the first panel or the second panel for a general usage from being recognized as an input of the folding back instruction or the folding hold instruction.

Figure 7:
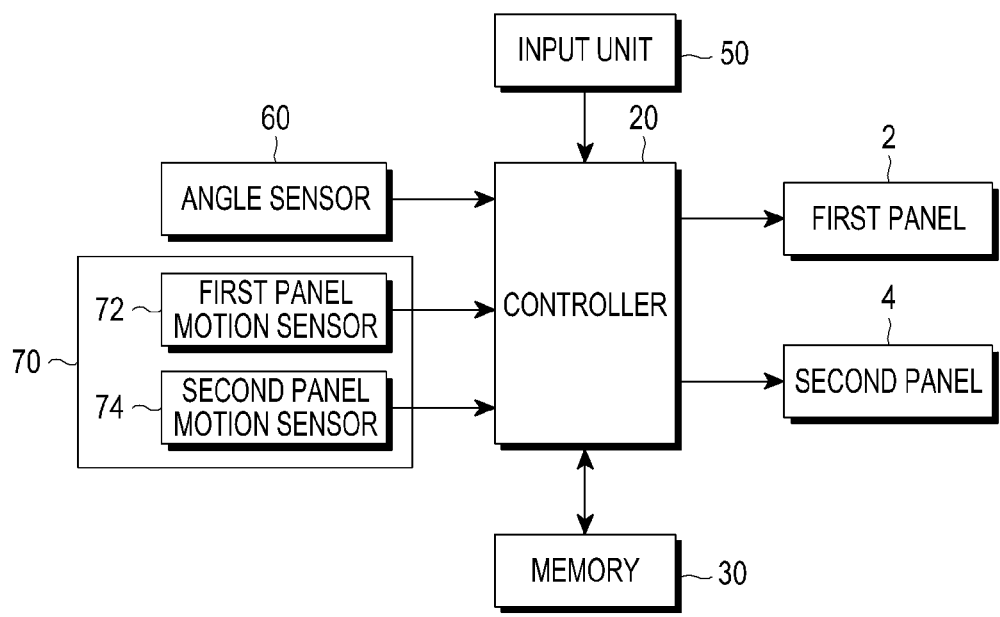
FIG. 7 is a block diagram illustrating a device including a first panel and a second panel according to an embodiment of the present invention.

FIG. 7 is a block diagram illustrating a device including a first panel and a second panel according to an embodiment of the present invention.

Referring to FIG. 7, the device includes the first panel 2 and the second panel 4, which are movably coupled with each other through an element such as the hinge 6, a controller 20, a memory 30, an input unit 50, an angle sensor 60, and a motion sensor 70.

The angle sensor 60, which is an element for detecting a relative angle between the first panel 2 and the second panel 4, may be integrally constructed with the hinge 6, or may be constructed as a separate element.

The input unit 50 receives user input, and includes function buttons 5 and 5'. Additionally, when the first screen 12 and the second screen 14 are touch screens, the first screen 12 and the second screen 14 may be include in the input unit 50. Further, a separate input device such as a keyboard or a mouse may be included as the input unit 50.

The motion sensor 70 detects movements of the first panel 2 and the second panel 4. Specifically, the motion sensor 70 includes a first panel motion sensor 72 for detecting a movement of the first panel 2 and a second panel motion sensor 74 for detecting a movement of the second panel 4. The first panel motion sensor 72 and the second panel motion sensor 74 may include an acceleration sensor, a gyro sensor, and/or a vibration sensor. Of course, individual elements, i.e., the first panel motion sensor 72 and the second panel motion sensor 74, are not required if the subdivision of the interface method of the present invention is not applied.

The angle sensor 60 and the motion sensor 70 may be constructed as a six axis sensor, which can detect all of relative angles between two panels and movements of the two panels.

The memory 30 stores mapping of the functions performed when the folding back instruction or the folding hold instruction is input. Functions according to the only instruction and the combination instruction are subdivided and stored. When a performed application varies depending on a driven application, subdivided functions according to the driven application are mapped and stored. Further, when the effective angle range is subdivided into a plurality of effective angle ranges and performed functions vary, subdivided functions according to each effective angle range are mapped and stored. Furthermore, when performed functions vary depending on which panel is moved, subdivided functions according to which panel is moved are mapped and stored. Descriptions for the mapping and storage of the functions will be described in more detail below with reference to FIG. 11.

The controller 20 controls the overall operation of the device. Particularly, the controller 20 recognizes the motions and angles sensed by the angle sensor 60 and the motion sensor 70, reads functions matched with the corresponding motions and angles from the memory 30, and controls the device to perform the corresponding functions.

Figure 8:
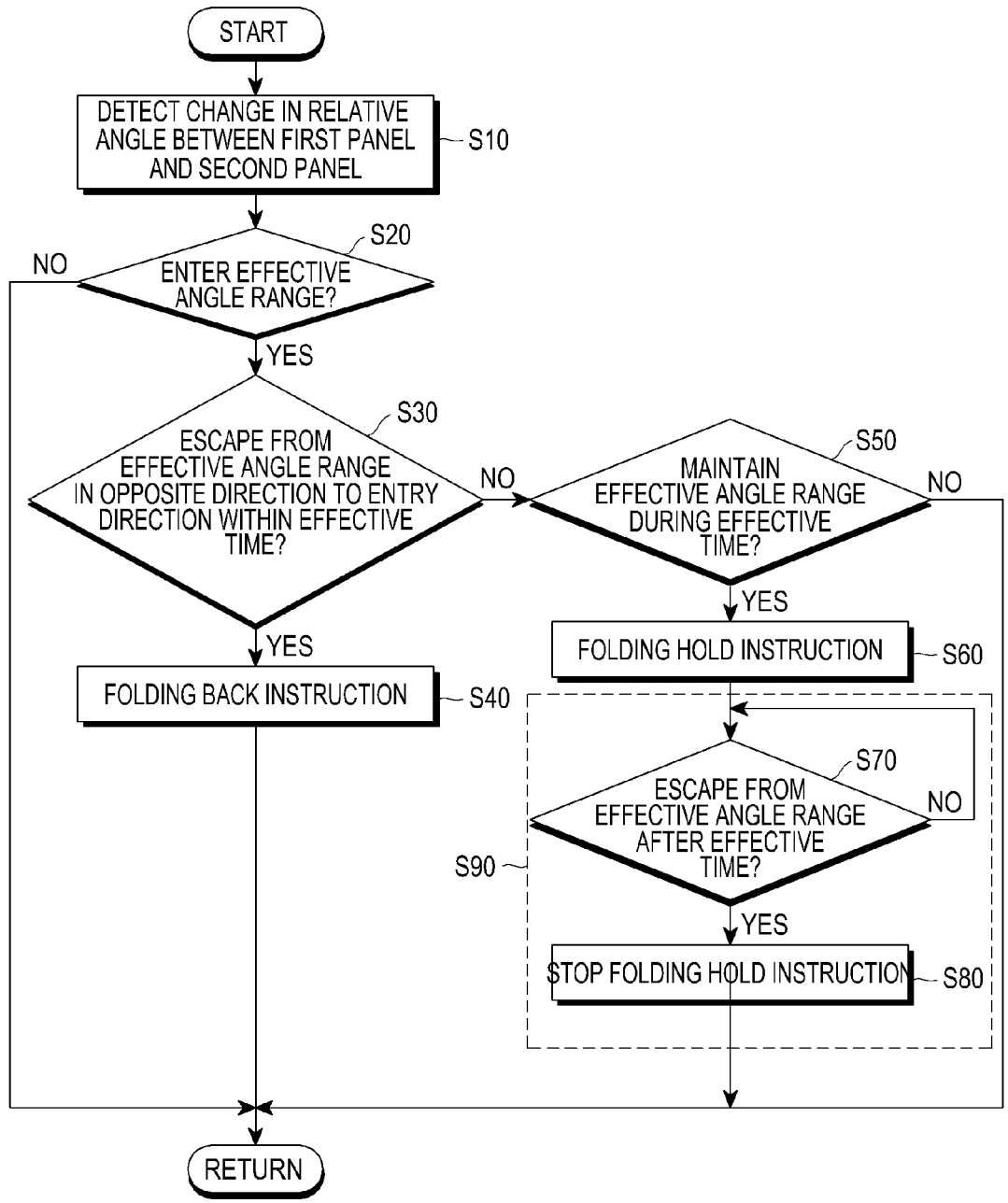
FIG. 8 is a flowchart illustrating a method of inputting commands according to an embodiment of the present invention.

FIG. 8 is a flowchart illustrating a method of inputting commands according to an embodiment of the present invention.

Referring to FIG. 8, the controller 20 detects a change in a relative angle between the first panel 2 and the second panel 4 through the angle sensor 60 in step S10. When the controller determines that the relative angle between two panels enters the effective angle range ($\Delta\alpha$) in step S20, is the controller 20 determines whether the relative angle moves out of the effective angle range in a direction opposite to an entry direction to the effective angle range, within the effective time from the entry point, in step S30. When the relative angle moves out of the effective angle range in the direction opposite to the entry direction to the effective angle range, within the effective time from the entry point, in S30, the controller 20 determines that the folding back instruction is input in step S40 and controls the device to perform a function corresponding to the folding back instruction.

However, when the relative angle does not move out of the effective angle range within the effective time from the entry point, in step S30, the controller 20 determines whether the relative angle between the two panels is maintained within the effective angle range for the effective time in step S50. When the relative angle between the two panels is maintained within the effective angle range for the effective time in step S50, the controller 20 determines that the folding hold instruction is input in step S60 and controls the device to perform a function corresponding to the folding hold instruction.

When the folding hold instruction corresponds to a function of performing a continuous operation, a process of stopping the folding hold instruction may be added, as shown in step S90.

Specifically, the controller determines whether the relative angle between the two panels moves out of the effective angle range in step S70. When the relative angle moves out the effective angle range, the function according to the folding hold instruction, which is being executed, is stopped in step S80. Here, moving the relative angle out of the effective angle range may occur in the same direction as the entry direction or the opposite direction to the entry direction.

When relative angle between the two panels is not maintained within the effective angle range for the effective time in step S50, for example, when the relative angle enters the effective angle range and then continues to move in the entry direction within the effective time, the controller 20 determines that no instruction is input.

Figure 9A:
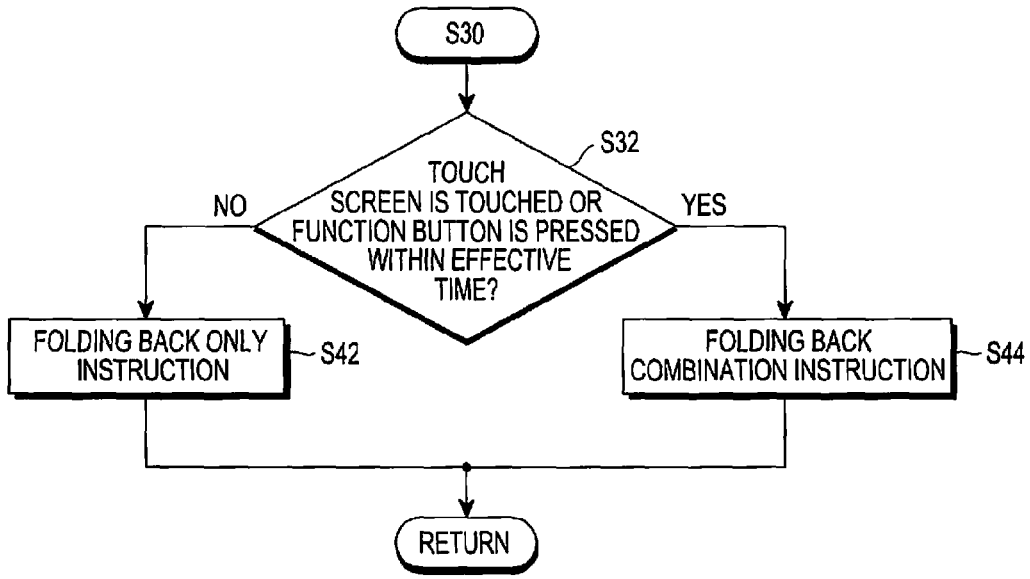
FIGS. 9A to 9B are flowcharts illustrating a method of subdividing input instructions based on whether an instruction is input through an input unit according to an embodiment of the present invention.
Figure 9B:
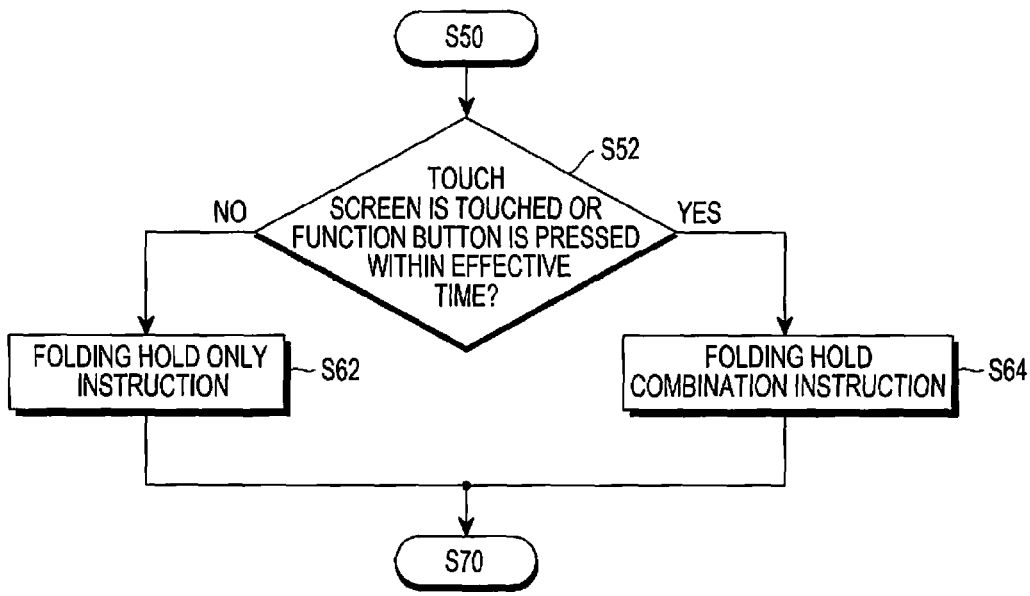

FIGS. 9A to 9B are flowcharts illustrating a method of subdividing input instructions based on whether an instruction is input through an input unit according to an embodiment of the present invention. Specifically, FIG. 9A illustrates a process of subdividing the folding back instruction, and FIG. 9B illustrates a process of subdividing the folding hold instruction.

Referring to FIG. 9A, when the requirements of the folding back instruction, e.g., as illustrated in the flowchart of FIG. 8, are satisfied (i.e., when step S30 proceeds to "YES"), the controller 20 determines whether there is a screen touch or a function button press within the effective time in step S32. Here, when there is no additional input by the user, a function corresponding to the folding back only instruction is performed in step S42. However, when there is an additional input by the user, the folding back combination instruction is performed in step S44.

Referring to FIG. 9B, when the requirements of the folding hold instruction, e.g., in the flowchart of FIG. 8, are satisfied (i.e., when step S50 proceeds to "YES"), the controller 20 determines whether there is a screen touch or a function button press within the effective time in step S52. Here, when there is no additional input by the user, a function corresponding to the folding hold only instruction is performed in step S62. However, when there is an additional input by the user, the folding hold combination instruction is performed in step S64.

Figure 10:
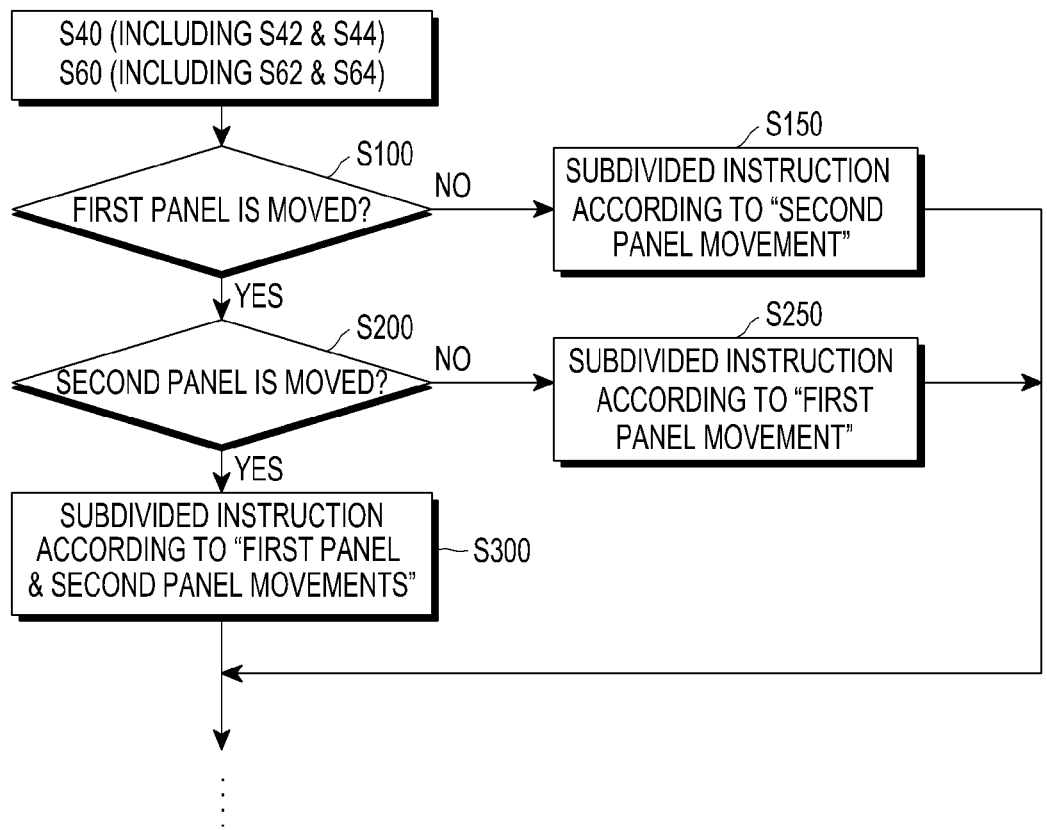
FIG. 10 is a flowchart illustrating a method of subdividing input instructions according to which of the panels is moved, according to an embodiment of the present invention.

FIG. 10 is a flowchart illustrating a method of subdividing input instructions according to which of the panels is moved, according to an embodiment of the present invention. FIG. 10 is a flowchart illustrating a process of subdividing the folding back instruction or the folding hold instruction according to which panel is moved.

Referring to FIG. 10, when the folding back instruction or the folding hold instruction is satisfied, e.g., as illustrated in the flowcharts of FIGS. 8 to 9 (in steps S40 and S60 of FIG. 8 and in steps S42, S44, S62, and S64 of FIG. 9), the controller 20 determines whether the first panel 2 is moved in step S100. When the controller 20 determines that the first panel 2 is not moved, the controller 20 determines that only the second panel 4 is moved and a function according to the subdivided instructions based on the movement of the second panel 4 is performed in step S150. However, when the controller 20 determines that the first panel 2 is moved, the controller 20 determines whether the second panel 4 is moved in step S200. When the controller 20 determines that the second panel 4 is not moved, the controller 20 determines that only the first panel 2 is moved and a function according to the subdivided instructions based on the movement of the first panel 2 is performed in step S250. However, when the controller 20 determines that the second panel 4 is moved in step S200, the controller 20 determines that both the first panel 2 and the second panel 4 have moved so that functions according to subdivided instructions based on the movements of the first panel 2 and the second panel 4 are performed in step S300.

Although not specifically illustrated, it also possible to further subdivide input instructions by combining the touch determination with the determination of which panel is moved, i.e., by determining whether there is an additional input, such as a screen touch or a function button press, for one or more panels of the two panels through a combination with the method illustrated in FIG. 10, i.e., which of the panels is touched.

FIG. 11 illustrates function mapping to each instruction input according to an embodiment of the present invention.

Referring to FIG. 11, is the commands are divided into a folding back instruction and a folding hold instruction. Further, the folding back instruction is subdivided into the folding back only instruction and the folding back combination instruction, and the folding hold instruction is subdivided into the folding hold only instruction and the folding hold combination instruction.

Further, movements of panels are divided into a movement of the first panel, a movement of the second panel, and movements of the first panel and the second panel.

Further, the effective angle range is subdivided into a plurality of effective angle ranges as necessary and different functions may be mapped to respective effective angle ranges.

For example, when a screen enlarging/reducing function, a zoom in/out function, or an electronic book (e-book) application is executed, different functions such as a chapter changing function and a book list changing function are mapped for each effective angle range.

Although the above-described embodiment describes that similar functions having a correlation with each other are subdivided according to a plurality of effective angle ranges, different functions may be mapped to a plurality of effective angle ranges, respectively.

Further, the mapping of the instructions and the functions as illustrated in FIG. 11 may set by a manufacturer or by a user.

Figure 12A:
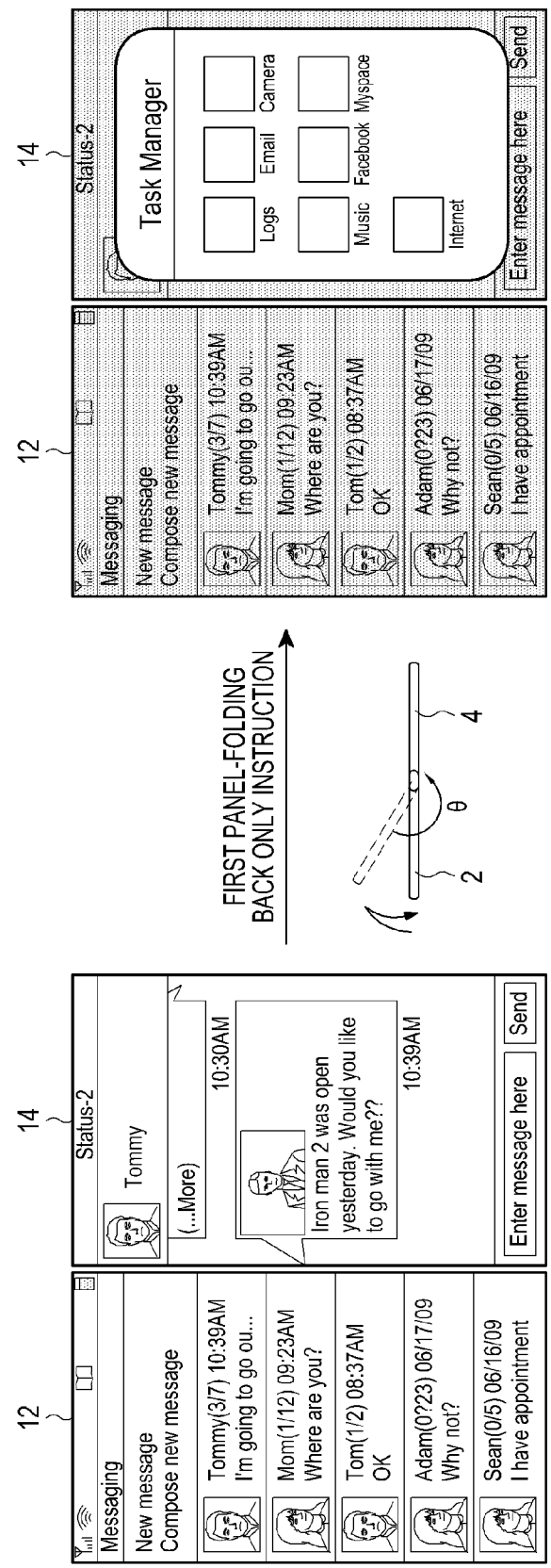
FIGS. 12A to 12C illustrate a folding back only instruction based on which of the panels is moved, according to an embodiment of the present invention.
Figure 12B:
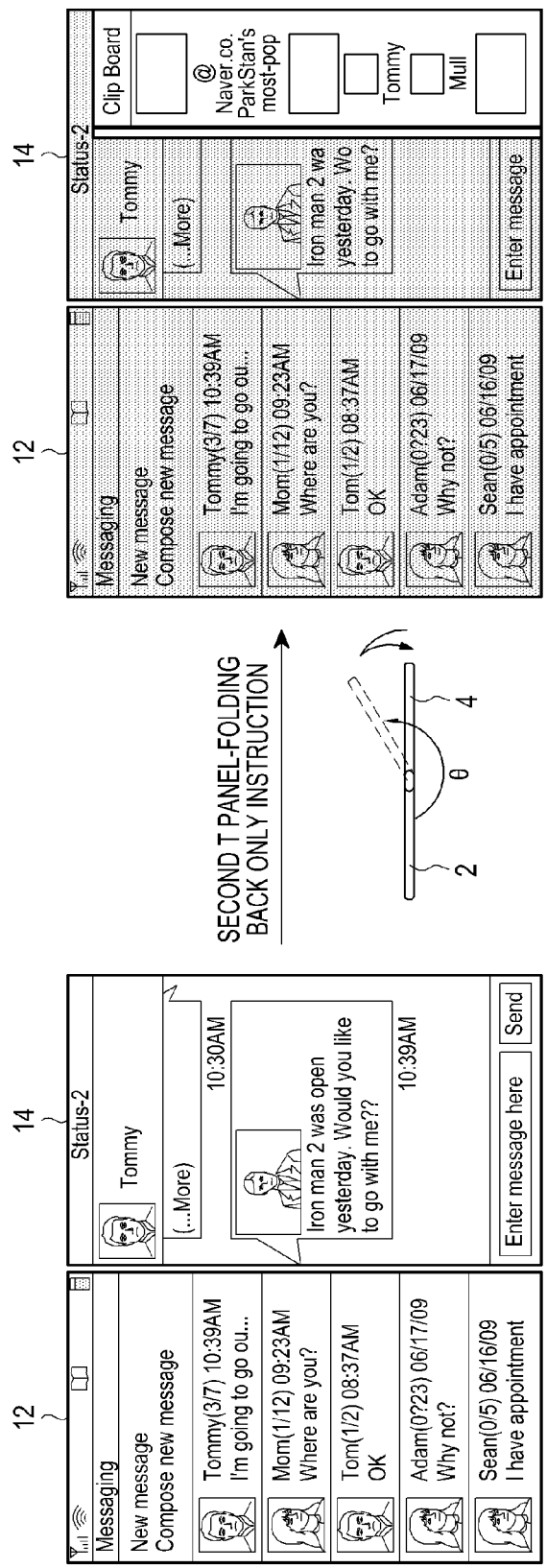
Figure 12C:
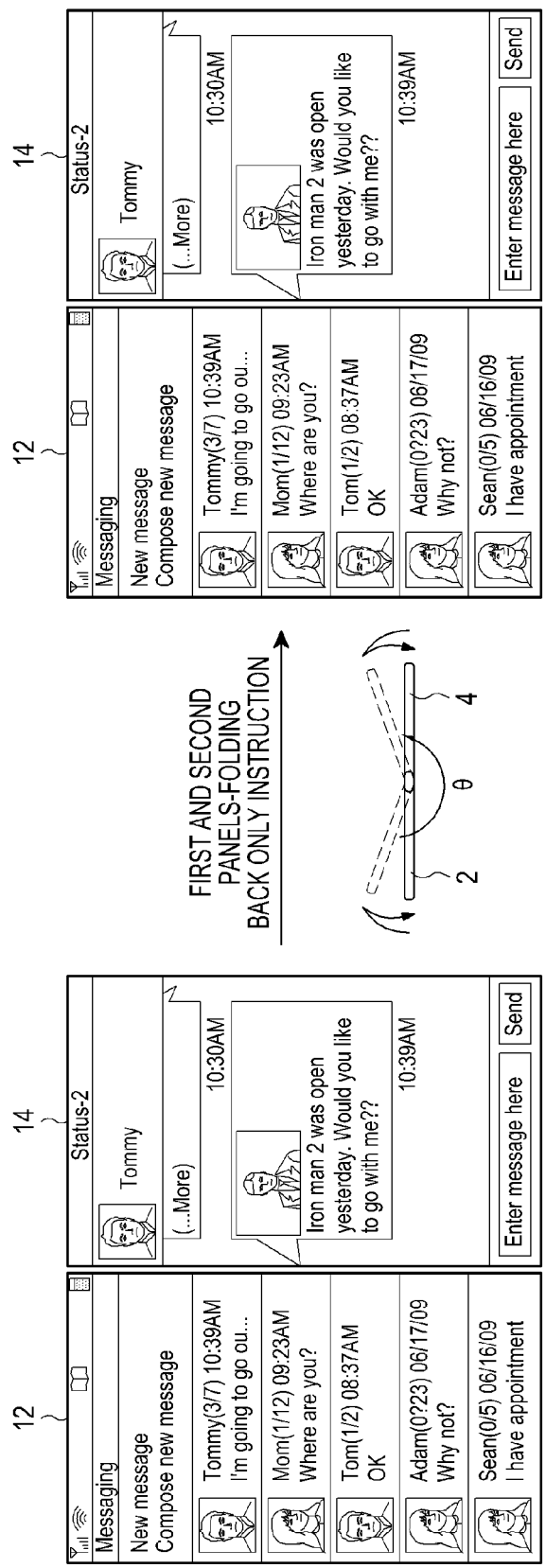

FIGS. 12A to 12C illustrate a folding back only instruction based on which of the panels is moved, according to an embodiment of the present invention. Specifically, FIG. 12A illustrates when the folding back only instruction is input through a movement of the first panel 2, FIG. 12B illustrates when the folding back only instruction is input through a movement of the second panel 4, and FIG. 12C illustrates when the folding back only instruction is input through movements of the first panel 2 and the second panel 4.

Referring to FIG. 12A, a messenger program is executed before an instruction input, and when the first panel 2 is folded such that a relative angle θ enters the effective angle range Δα and the first panel 2 is unfolded within the effective time such that the relative angle moves out of the effective angle range through a movement of the first panel in a direction opposite to the entry direction to the effective angle range, the folding back only instruction based on the movement of the first panel is input. Thereafter, a task manager, which is the function mapped to the folding back only instruction, is executed.

Referring to FIG. 12B, a messenger program is executed before an instruction input, and when the second panel 4 is folded such that a relative angle θ enters the effective angle range Δα and the second panel 4 is unfolded within the effective time such that the relative angle moves out of the effective angle range through a movement of the second panel in a direction opposite to the entry direction to the effective angle range, the folding back only instruction based on the movement of the second panel is input. Thereafter, a clipboard function, which is the function mapped to the folding back only instruction, is executed.

Referring to FIG. 12C, a messenger program is executed before an instruction input, and when the first panel 2 and the second panel 4 are folded such that a relative angle θ enters the effective angle range Δα and the first panel 2 and the second panel 4 are unfolded within the effective time such that the relative angle moves out of the effective angle range through movements of the first panel and the second panel in a direction opposite to the entry direction to the effective angle range, the folding back only instruction based on the movements of the first panel and the second panel is input. Thereafter, a screen capture function, which is the function mapped to the folding back only instruction, is executed, storing the current screen as an image in a picture gallery.

Figure 13A:
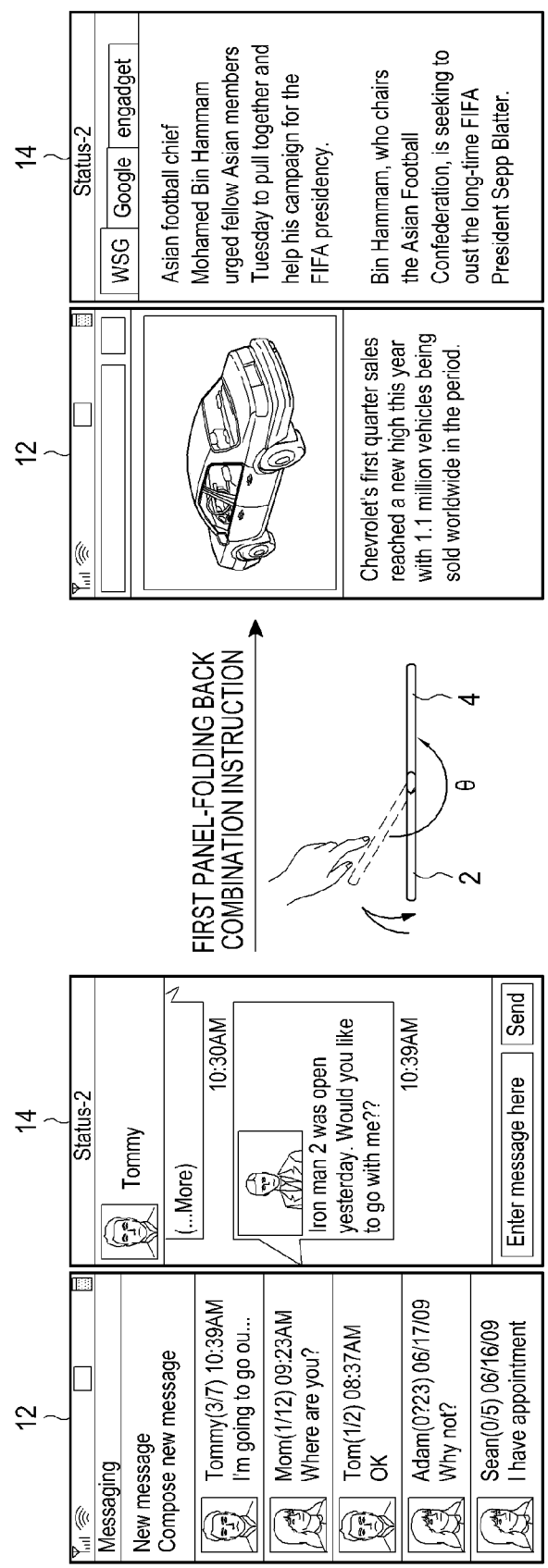
FIGS. 13A to 13C illustrate a folding back combination instruction based on a which of the panels is moved, according to an embodiment of the present invention.
Figure 13B:
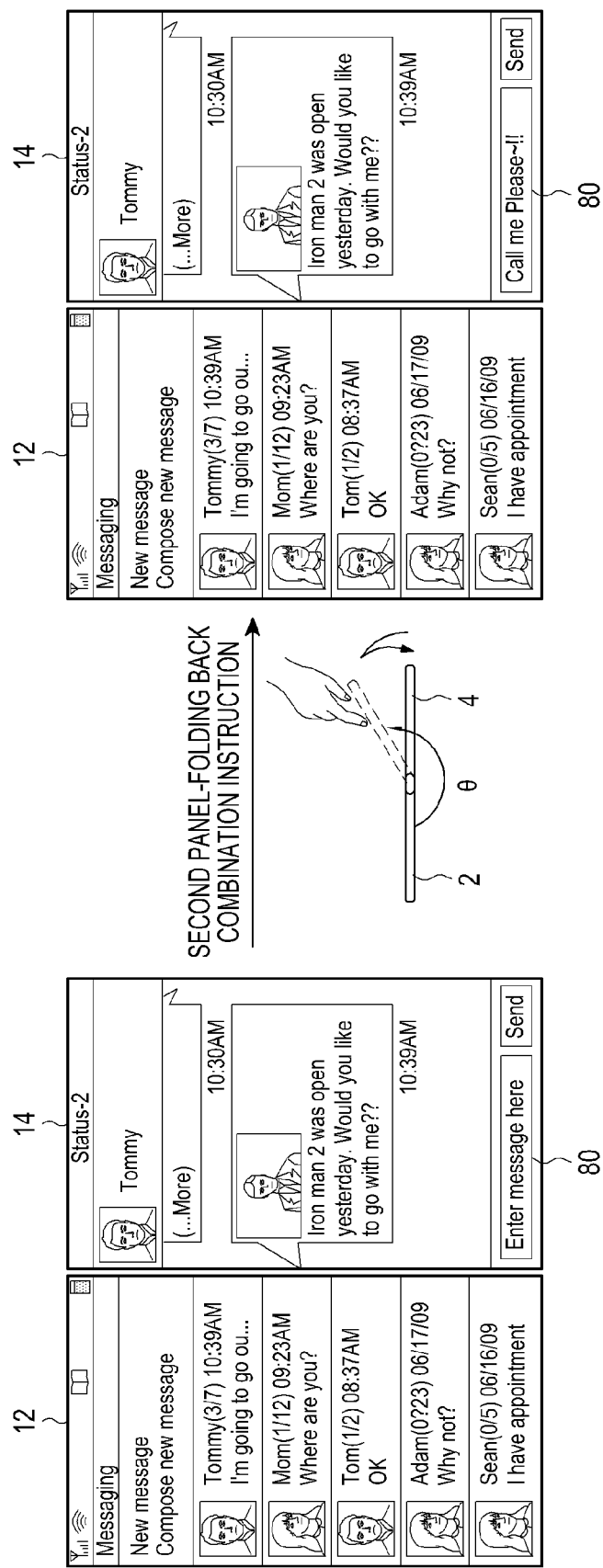
Figure 13C:
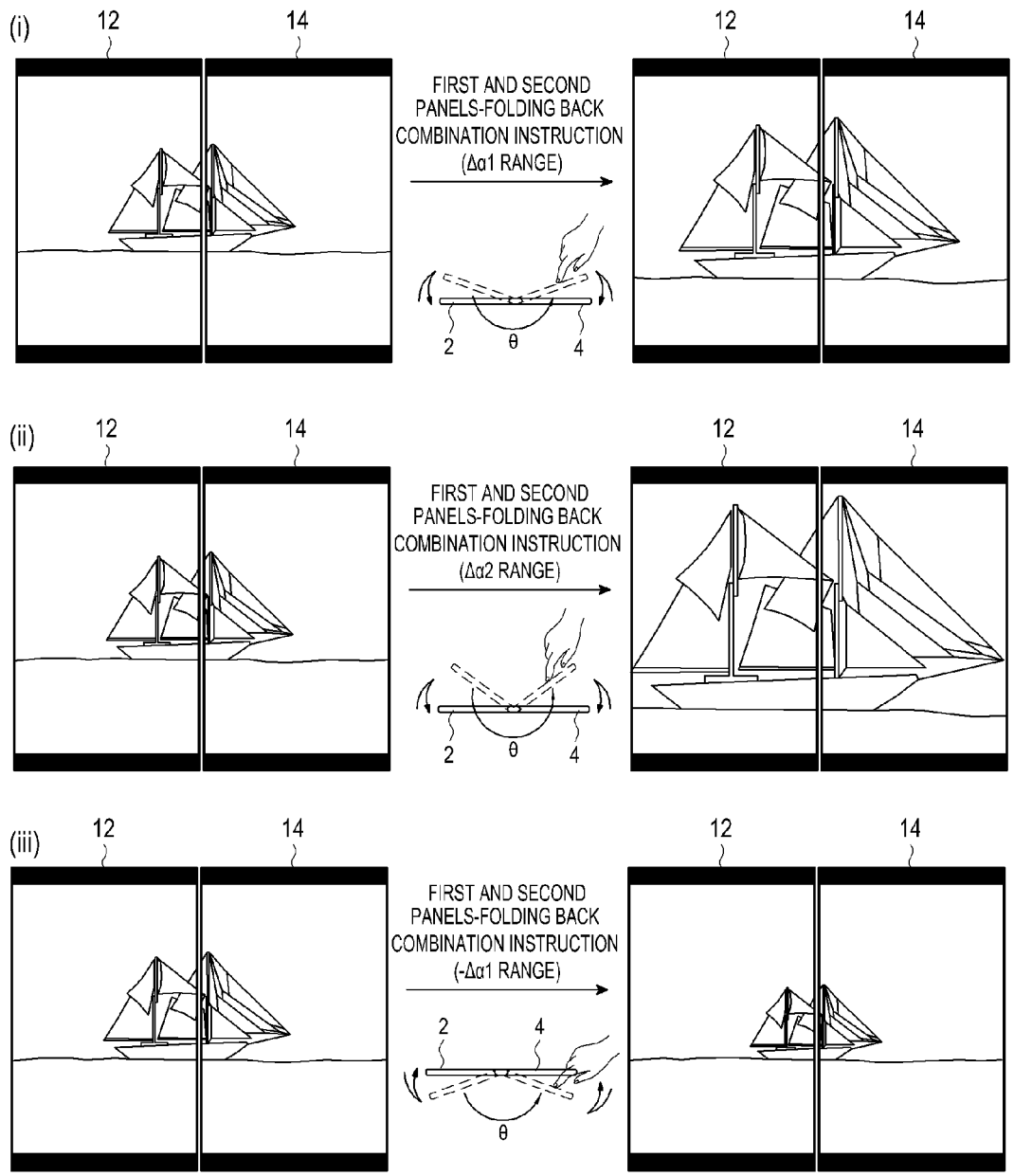

FIGS. 13A to 13C illustrate a folding back combination instruction based on which of the panels is moved, according to an embodiment of the present invention. Specifically, FIG. 13A illustrates when the folding back combination instruction is input through a movement of the first panel 2, FIG. 13B illustrates when the folding back combination instruction is input through a movement of the second panel 4, and FIG. 13C illustrates when the folding back combination instruction is input through movements of the first panel 2 and the second panel 4, and where the function is subdivided according to a plurality of effective angle ranges.

Referring to FIG. 13A, before an instruction input, many applications are simultaneously executed through multitasking and a messenger program is activated. In this state, the folding back combination instruction based on a movement of the first panel 2 is input when the first panel 2 is folded such that a relative angle θ enters the effective angle range Δα, the first panel 2 is unfolded within the effective time such that the relative angle moves out of the effective angle range in a direction opposite to the entry direction to the effective angle range, and a screen is touched or the function button 5 or 5' is pressed within the effective time. In this case, the messenger program is terminated, and a web browser, which is the task that was executed right before the messenger program was executed, is displayed.

Referring to FIG. 13B, a messenger program is executed before an instruction is input. When a user desires to input, i.e., paste, content previously copied to a clipboard, i.e., "Call me Please~!!", into the messenger program, the folding back combination instruction based on a movement of the second panel 4 is input and a message "Call me Please~!!", is automatically input to a position 80, where a text is input into the messenger program, when the second panel 4 is folded such that a relative angle θ enters the effective angle range Δα, the second panel 4 is unfolded within the effective time such that the relative angle moves out of the effective angle range through a movement of the second panel in a direction opposite to the entry direction to the effective angle range, and a screen is touched or the function button 5 or 5' is pressed within the effective time.

Referring to FIG. 13C, if a picture is displayed on a screen as a picture gallery through a currently driven application, the folding back combination instruction based on movements of the first panel and the second panel is input and a function of enlarging a currently viewed screen by two times is executed (FIG. 13C (i)), when the first panel 2 and the second panel 4 are folded such that a relative angle θ enters the effective angle range Δα1 among the plurality of effective angle ranges, the first panel 2 and the second panel 4 are unfolded within the effective time such that the relative angle moves out of the effective angle range through the movements of the first panel and the second panel in a direction opposite to the entry direction to the effective angle range, and a screen is touched or the function button 5 or 5' is pressed within the effective time.

If the user desires to enlarge a current screen by four times, a function of enlarging the screen by four times is executed (FIG. 13C (ii)) when the first panel 2 and the second panel 4 are folded such that a relative angle θ enters the effective angle range Δα2, the first panel 2 and the second panel 4 are unfolded within the effective time such that the relative angle moves out of the effective angle range through the movements of the first panel and the second panel in a direction opposite to the entry direction to the effective angle range, and a screen is touched or the function button 5 or 5' is pressed within the effective time.

Further, if the user desires to reduce the current screen by 1/2 times, a function of reducing the screen by 1/2 times is executed (FIG. 3C (iii)) when the first panel 2 and the second panel 4 are folded such that a relative angle θ enters an effective angle range −Δα1, the first panel 2 and the second panel 4 are unfolded within the effective time such that the relative angle moves out of the effective angle range based on movements of the first panel and the second panel in a direction opposite to the entry direction to the effective angle range, and a screen is touched or the function button 5 or 5' is pressed within the effective time.

Further, the effective angle range can be subdivided into as large a number of effective angle ranges as necessary, such that it is possible to enlarge/reduce a screen by 6, 8, or more times.

Figure 14B:
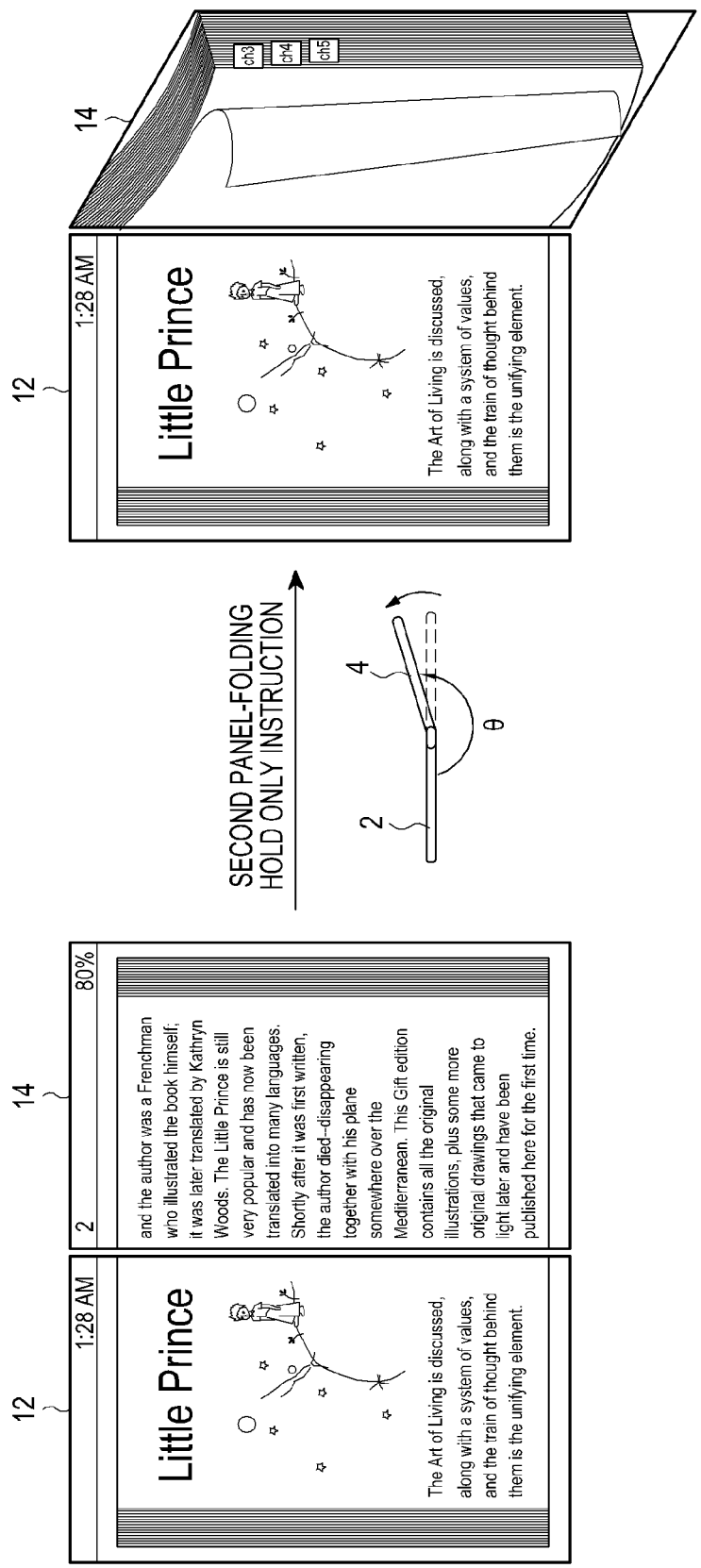
Figure 14C:
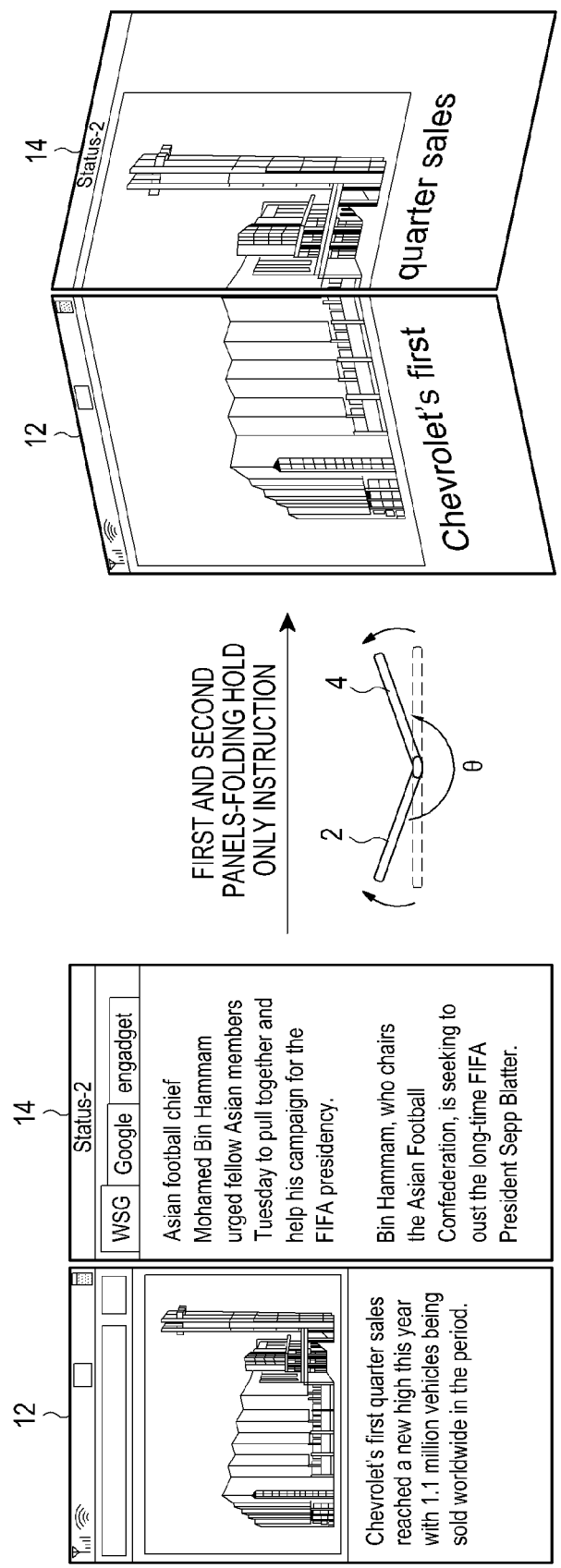

FIGS. 14A to 14C illustrates a folding hold only instruction based on which of the panels is moved, according to an embodiment of the present invention. Specifically, FIG. 14A illustrates when the folding hold only instruction is input through a movement of the first panel 2, FIG. 14B illustrates when the holding hold only instruction is input through a movement of the second panel 4, and FIG. 14C illustrates when the holding hold only instruction is input through movements of the first panel 2 and the second panel 4.

Referring to FIG. 14A, before an instruction input, many applications are simultaneously executed with a multitasking and a web browser program is activated. In this state, when the first panel 2 is folded such that the relative angle θ enters the effective angle range Δα and the relative angle θ is maintained for the effective time, the folding hold only instruction based on a movement of the first panel is input. In this case, the currently activated and executed web browser program is deactivated, but not terminated, and applications executed before the web browser are sequentially changed continuously. When a desired application among the sequentially changed applications is activated, the desired application can be selected when the first panel 2 and/or the second panel 4 are moved such that the relative angle θ moves out of the effective angle range.

Referring to FIG. 14B, a currently executed application is an e-book, and a function of successively turning pages from a current page to a next page is executed when the second panel 4 is folded such that the relative angle θ enters the effective angle range Δα and the relative angle θ is maintained in the state for the effective time. Thereafter, when the user reaches a desired page among continuously turned pages, the desired page is selected, when the first panel 2 and/or the second panel 4 are moved such that the relative angle θ moves out of the effective angle range.

Although not illustrated in FIG. 14B, it is possible to subdivide the effective angle range into a plurality of effective angle ranges for the function of turning pages like the folding back combination instruction (refer to FIG. 13C) based on the movements of the first panel and the second panel. That is, as is mapped in FIG. 11, when the effective angle range is subdivided into Δα1, Δα2, −Δα1, −Δα2, a 1× page back turning function is executed if the effective angle range is Δα1, a 2× page back turning function is executed if the effective angle range is Δα2, a 1× page forward turning function is executed if the effective angle range is −Δα1, and a 2× page forward turning function is executed if the effective angle range is −Δα2.

Referring to FIG. 14C, when a web page screen is displayed through an execution of a current web browser program, the folding hold only instruction based on movements of the first panel 2 and the second panel 4 is input when the first panel 2 and the second panel 4 are folded such that the relative angle θ enters the effective angle range Δα and the state is maintained for the effective time. Then, a currently viewed screen is successively zoomed-in and then enlarged. Thereafter, when a properly enlarged screen desired by the user is displayed in the successive zoom state, a selected web page having an enlarged size is displayed when the first panel 2 and/or the second panel 4 are moved such that the relative angle θ moves out of the effective angle range.

Although not illustrated in FIG. 14C, the effective angle range can be subdivided into a plurality of effective angle ranges for the zoom-in/zoom-out function like the folding back combination instruction due to the movements of the first panel and the second panel (e.g., FIG. 13C). That is, as is mapped in FIG. 11, when the effective angle range is subdivided into Δα1, Δα2, −Δα1, −Δα2, a 1× zoom-in function is executed if the effective angle range is Δα1, a 2× zoom-in function is executed if the effective angle range is Δα2, a 1× zoom-out function is executed if the effective angle range is −Δα1, and a 2× zoom-out function is executed if the effective angle range is −Δα2.

Figure 15A:
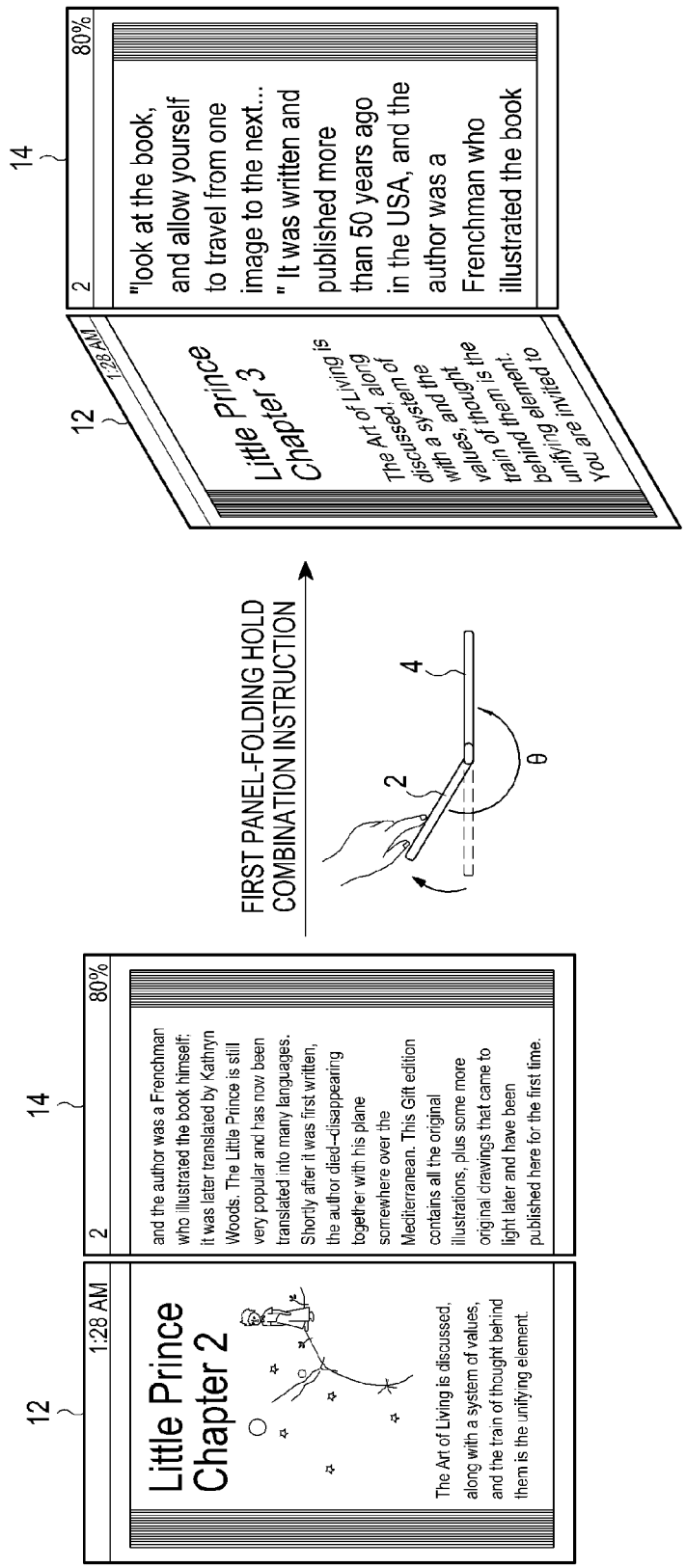
FIGS. 15A to 15C illustrate a folding hold combination instruction based on which of the panels is moved, according to an embodiment of the present invention.
Figure 15B:
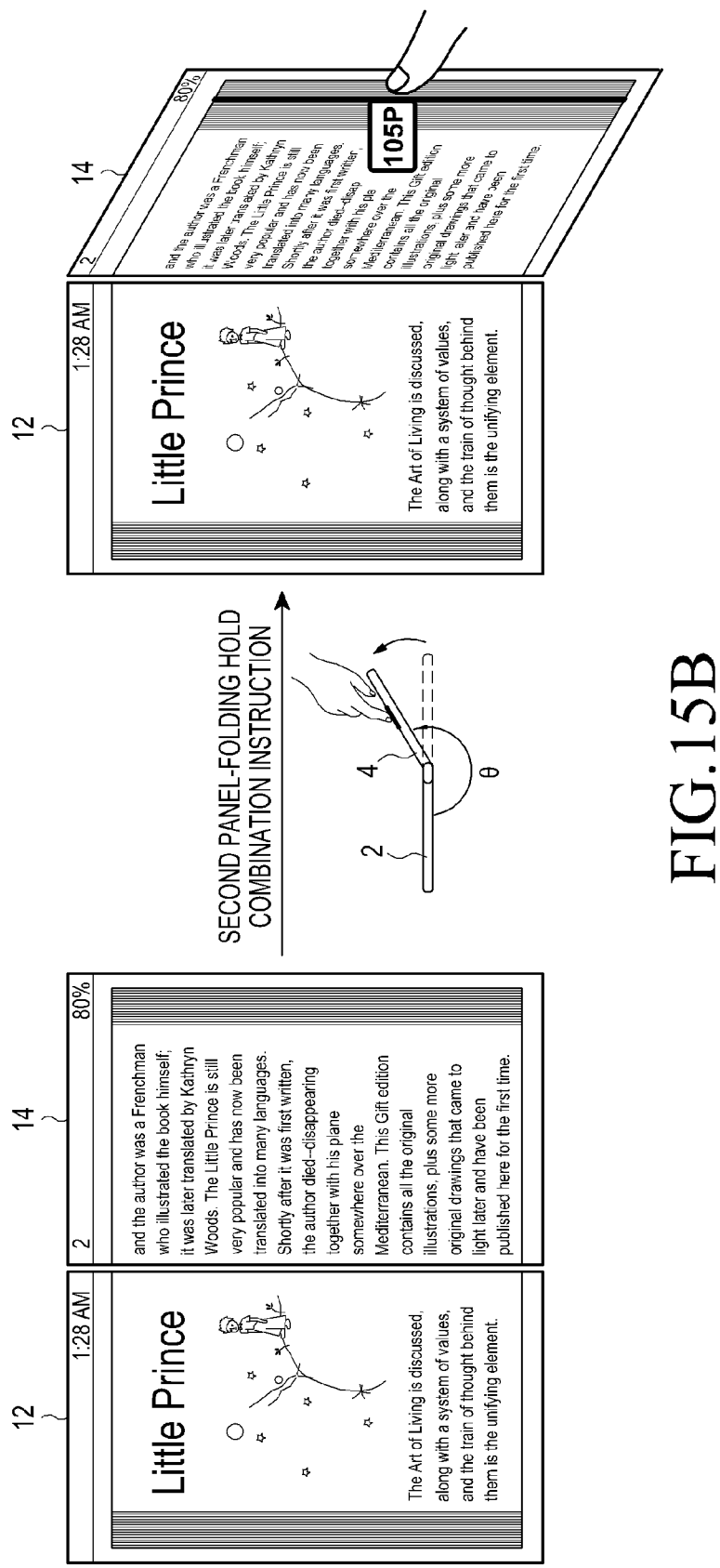
Figure 15C:
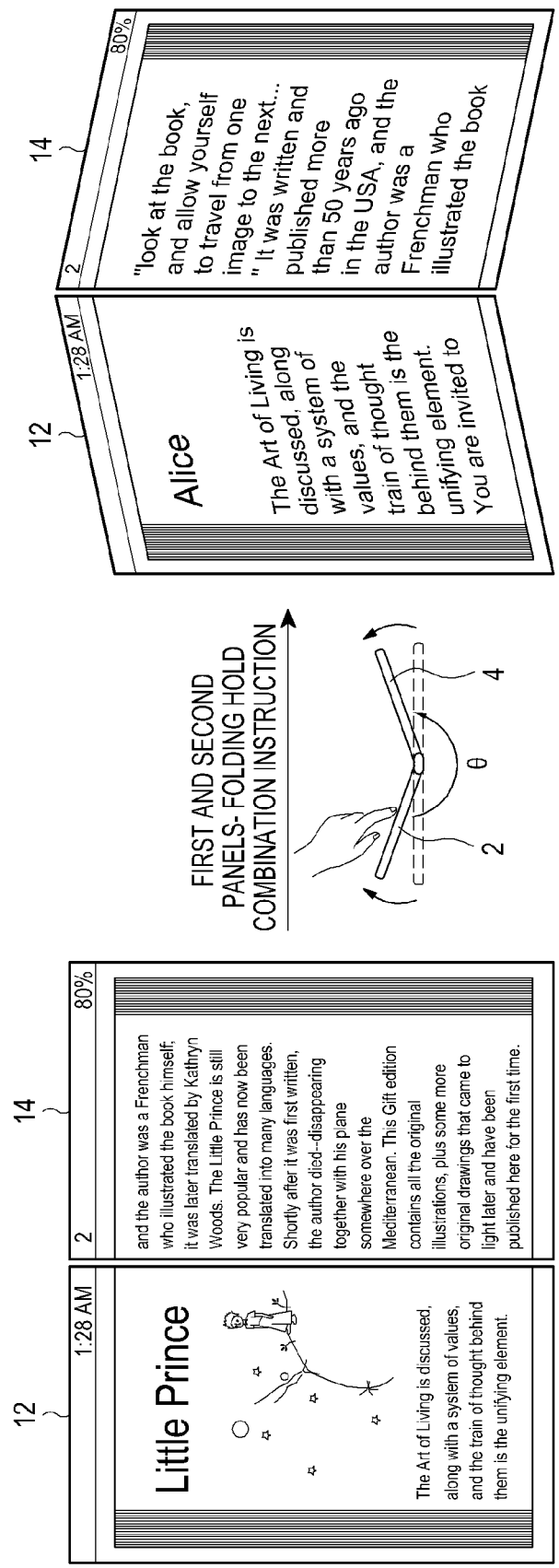

FIGS. 15A to 15C illustrate a folding hold combination instruction based on which of the panels is moved, according to an embodiment of the present invention. Specifically, FIG. 15A illustrates when the folding hold combination instruction is input through a movement of the first panel 2, FIG. 15B illustrates when the folding hold combination instruction is input through a movement of the second panel 4, and FIG. 15C illustrates when the folding hold combination instruction is input through movements of the first panel 2 and the second panel 4.

Referring to FIG. 15A, a currently executed application is an e-book, and a function of changing a book's chapter including a current page to a next chapter is executed when the first panel 2 is folded such that the relative angle θ enters the effective angle range Δα, the state is maintained for the effective time, and a screen is touched or the function button 5 or 5' is pressed within the effective time.

Although it is described that a one-time operation is performed, it is possible to continuously change a chapter to a next chapter and also possible to construct in such a manner that a corresponding chapter is selected when the first panel 2 and/or the second panel 4 are moved such that the relative angle θ moves out of the effective angle range once the chapter reaches a desired chapter.

Further, although it is not illustrated in the drawings, the effective angle range can be subdivided into a plurality of effective angle ranges for the chapter changing function like the folding back combination instruction based on the movements of the first panel 2 and the second panel 4 (e.g., FIG. 13C). That is, as is mapped in FIG. 11, when the effective angle range is subdivided into Δα1 and −Δα1, a function of changing a chapter to a next chapter is executed if the effective angle range is Δα1, and a function of changing a chapter to a previous chapter is executed if the effective angle range is −Δα1.

Referring to FIG. 15B, a currently executed application is an e-book, and a function of selecting a detailed page is executed when the second panel 4 is folded such that the relative angle θ enters the effective angle range Δα, the state is maintained for the effective time, and a screen is touched or the function button 5 or 5' is pressed within the effective time. That is, as illustrated in FIG. 15B, a popup window for showing a page and a line indicating the page is displayed and it is possible to directly move a page to a desired page by dragging the page indication line in a left/right direction.

Referring to FIG. 15C, a currently executed application is an e-book, and a function of changing a current book to a next book included in a book list is executed when the first panel 2 and the second panel 4 are folded such that the relative angle θ enters the effective angle range Δα, the state is maintained for the effective time, and a screen is touched or the function button 5 or 5' is pressed within the effective time. That is, as illustrated in FIG. 15C, when books "Little Prince" and "Alice" are listed-up in the book list and a currently read book is "Little Prince", the function is executed so that the book "Little Prince" is changed to the book "Alice", which is a next book in the book list.

Although not illustrated in FIG. 15C, the effective angle range can be subdivided into a plurality of effective angle ranges for the book changing function like the folding back combination instruction based on the movements of the first panel 2 and the second panel 4 (e.g., FIG. 13C). That is, as is mapped in FIG. 11, when the effective angle range is subdivided into Δα1 and −Δα1, a function of changing a book to a next book in the book list is executed if the effective angle range is Δα1, and a function of changing a book to a previous book in the book list is executed if the effective angle range is −Δα1.

FIG. 16 illustrates function mapping to an instruction input according to an embodiment of the present invention.

Referring to FIG. 16, when the folding hold only instruction is input through a movement of the second panel, for example, when a currently driven application is a media player, a play related function is executed. Specifically, when the effective angle range is subdivided into Δα1, Δα2, −Δα1, −Δα2, a 2× fast-forward function is executed if the effective angle range is Δα1, a 4× fast-forward function is executed if the effective angle range is Δα2, a 2× rewind function is executed if the effective angle range is −Δα1, and a 4× rewind function is executed if the effective angle range is −Δα2. Although the plurality of effective angle ranges are described, the number of effective angle ranges may very, and even include just one.

Further, when a user desires to stop the fast-forward function or the rewind function, the first panel 2 and/or the second panel 4 are moved such that the relative angle moves out of the effective angle range and then an original state before the instruction input returns in the same way as described above.

When the folding hold combination instruction is input through a movement of the second panel, for example, when a currently driven application is a media player, a function of showing a channel/list of the media player is executed.

When the folding hold combination instruction is input through a movement of the first panel, for example, when a currently driven application is a web browser, a function of showing a history (opened pages) is executed.

Further, when the folding hold combination instruction is input through movements of the first panel and the second panel, for example, when a currently driven application is a web browser, a function of showing a bookmark (favorite) is executed.

FIG. 16 illustrates that mapped functions vary depending on driven applications, and the functions are not replaced with the mapped functions shown in FIG. 11. That is, while FIG. 11 illustrates functions that can be mapped when a specific application, i.e., an e-book, is driven, FIG. 16 illustrates functions that can be mapped when other applications, which are not the e-book application, are driven.

Accordingly, the mapped functions corresponding to the e-book application of FIG. 11 are not replaced with the mapped functions corresponding to the web browser or the video player application of FIG. 16, but they are compatible. That is, when the folding hold only instruction is input by the same second panel, the page turning effect function of FIG. 11 is executed if a driven application is an e-book, and the fast-forward function or the rewind function of FIG. 16 is executed if the driven application is the media player.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method inputting an operation instruction for a device including a first panel and a second panel, the method comprising:
determining whether a relative angle between the first panel and the second panel is within an effective angle range;
determining whether the relative angle within the effective angle range is maintained during an effective time;
determining whether an operation instruction to the device is input based on whether the relative angle between the first panel and the second panel is within the effective angle range and whether the relative angle within the effective angle range is maintained during the effective time; and
executing the determined operation instruction,
wherein the operation instruction executes different functions according to each of effective angle ranges being set as a plurality of different angle ranges, and
wherein the operation instruction executes different functions according to applications driven on the first panel and the second panel of the device.

2. The method of claim 1, further comprising determining that a folding hold instruction is input if the relative angle between the first panel and the second panel is maintained for a time at least equal to the effective time, after the relative angle enters the effective angle range.

3. The method of claim 2, wherein the folding hold instruction corresponds to an instruction by which successive operations are performed.

4. The method of claim 3, wherein the successive operations are stopped if the relative angle between the first panel and the second panel moves out of the effective angle range, after the effective time.

5. The method of claim 1, wherein the operation instruction is subdivided such that the operation instruction executes different functions according to an existence of an additional input within the effective time through an input unit included in the device.

6. The method of claim 5, wherein the additional input is performed through a touch on a touch screen or a function button included the device.

7. A method for inputting a folding back instruction in a device including a first panel and a second panel, the method comprising:
determining whether a relative angle between the first panel and the second panel moves into an effective angle range;
determining whether a direction of magnitude change of the relative angle entering the effective angle range between the first panel and the second panel is in a direction opposite a direction of magnitude change leaving the effective angle range, within a predetermined time after the relative angle moves into the effective angle range;
determining that the folding back instruction is input if the relative angle between the first panel and the second panel moves out of the effective angle range in the opposite direction to an entry direction to the effective angle range within the predetermined time after the relative angle moves into the effective angle range; and
executing the determined folding back instruction,
wherein the folding back instruction executes different functions according to each of effective angle ranges being set as a plurality of different angle ranges.

8. The method of claim 7, wherein the folding back instruction is subdivided such that different functions are executed according to an existence of an additional input through a touch on a touch screen or a function button included in the device within the predetermined time.

9. A method for inputting a folding back instruction in a device including a first panel and a second panel, the method comprising:
- determining whether at least one of the first panel and the second panel are moved in a first direction, such that a relative angle between the first panel and the second panel is changed;
- determining whether at least one of the first panel and the second panel are moved in a second direction, opposite to the first direction, such that the relative angle between the first panel and the second panel is changed;
- determining that the folding back instruction is input if the at least one of the first panel and the second panel is moved in the first direction and then moved in the second direction; and
- executing the determining folding back instruction,
- wherein the folding back instruction executes different functions according to each of the effective angle ranges being set as a plurality of different angle ranges.

10. The method of claim 9, wherein the folding back instruction is subdivided such that different functions are executed according to an existence of an additional input through a touch on a touch screen or a function button.

11. An apparatus for inputting an operation instruction, the apparatus comprising:
- a first panel;
- a second panel hingedly connected to the first panel;
- an angle sensor configured to detect a relative angle between the first panel and the second panel; and
- a controller configured to:
- determine whether a relative angle between the first panel and the second panel is within an effective angle range,
- to determine whether the relative angle within the effective angle range is maintained during an effective time,
- to determine whether an operation instruction is input based on whether the relative angle between the first panel and the second panel is within an effective angle range, and whether the relative angle is maintained within the effective angle range for an effective time, and
- to execute the determined operation instruction,
- wherein the operation instruction executes different functions according to each of effective angle ranges being set as a plurality of different angle ranges, and
- wherein the operation instruction executes different functions according to applications driven on the first panel and the second panel of the device.

12. The apparatus of claim 11, wherein the controller is configured to determine that a folding hold instruction is input if the relative angle between the first panel and the second panel enters the effective angle range and the effective angle range is maintained for the effective time.

13. The apparatus of claim 12, wherein the controller is configured to execute a function of performing successive operations if the folding hold instruction is input.

14. The apparatus of claim 13, wherein the controller is configured to stop the function of performing the successive operations if the relative angle between the first panel and the second panel moves out of the effective angle range after the effective time.

15. The apparatus of claim 11, further comprising:
- an input unit,
- wherein the controller is configured to subdivide the operation instruction and to execute different functions according to an existence of an additional input through the input unit within the effective time.

16. The apparatus of claim 11, further comprising:
- a motion sensor configured to detect movements of the first panel and the second panel,
- wherein the controller is configured to subdivide the operation instruction such that the operation instruction executes different functions according whether a movement of the first panel is detected, whether a movement of the second panel is detected, and whether movements of the first panel and the second panel are detected through the motion sensor.

17. The apparatus of claim 16, wherein the angle sensor and the motion sensor each comprise a six axis sensor that detects the relative angle between the first panel and the second panel and existence of movements of the first panel and the second panel.

18. The apparatus of claim 11, wherein the effective angle range is set as a plurality of different angle ranges and the controller subdivides the operation instruction and executes different functions according to each of the plurality of different angle ranges.

19. The apparatus of claim 11, further comprising:
- a memory that stores a function corresponding to the operation instruction.

20. An apparatus for inputting a folding back instruction, the apparatus comprising:
- a first panel;
- a second panel hingedly connected to the first panel;
- an angle sensor configured to detect a relative angle between the first panel and the second panel; and
- a controller configured:
- to determine whether a relative angle between the first panel and the second panel moves into an effective angle range,
- to determine whether a direction of magnitude change of the relative angle entering the effective angle range between the first panel and the second panel is in a direction opposite a direction of magnitude change leaving the effective angle range, within a predetermined time after the relative angle moves into the effective angle range,
- to determine that the folding back instruction is input if the relative angle between the first panel and the second panel moves out of the effective angle range in the opposite direction to an entry direction into the effective angle range within the predetermined time after the relative angle enters the effective angle range, and
- to execute the determined folding back instruction,
- wherein the folding back instruction executes different functions according to each of effective angle ranges being set as a plurality of different angle ranges.

21. The apparatus of claim 20, further comprising:
- an input unit,
- wherein the controller is configured to subdivide the folding back instruction and to execute different functions according to an existence of an additional input through the input unit within the predetermined time.

22. The apparatus of claim 20, further comprising:
- a motion sensor configured to detect movements of the first panel and the second panel,
- wherein the controller is configured to subdivide the folding back instruction and to execute different functions according to whether a movement of the first panel is detected, whether a movement of the second panel is detected, and whether movements of the first panel and the second panel are detected through the motion sensor.

23. The apparatus of claim 22, wherein each of the angle sensor and the motion sensor comprises a six axis sensor that detects the relative angle between the first panel and the second panel and an existence of movements of the first panel and the second panel.

24. The apparatus of claim 20, wherein the effective angle range is set as a plurality of different angle ranges and the controller subdivides the folding back instruction and executes different functions according to each of the plurality of different angle ranges.

25. An apparatus for inputting a folding back instruction, the apparatus comprising:
  a first panel;
  a second panel hingedly connected to the first panel;
  an angle sensor configured to detect a relative angle between the first panel and the second panel; and
  a controller configured:
    to determine whether at least one of the first panel and the second panel are moved in a first direction, such that a relative angle between the first panel and the second panel is changed,
    to determine whether at least one of the first panel and the second panel are moved in a second direction, opposite to the first direction, such that the relative angle between the first panel and the second panel is changed,
    to determine that the folding back instruction is input if the at least one of the first panel and the second panel is moved in a first direction and then moved in a second direction, and
    to execute the determined the folding back instruction,
  wherein the folding back instruction executes different functions according to each of effective angle ranges being set as a plurality of different angle ranges.

26. The method of claim 1, wherein the operation instruction executes different functions according to whether the first panel moves to enter the effective angle range, the second panel moves to enter the effective angle range, and the first and the second panels move to enter the effective angle range.

27. The method of claim 1, further comprising determining that a folding back instruction is input if the first panel or the second panel moves in an opposite direction to an entry direction to move out of the effective angle range within the effective time.

28. The method of claim 7, wherein the folding back instruction executes different functions according to whether the first panel moves to enter the effective angle range, the second panel moves to enter the effective angle range, and the first and the second panels move to enter the effective angle range.

29. The apparatus of claim 11, wherein the controller is further configured to determine that the folding back instruction is input if a direction of magnitude change of the relative angle entering the effective angle range between the first panel and the second panel is a direction opposite direction of magnitude change leaving the effective angle range within the effective time, after the relative angle enters the effective angle range.

30. A method for inputting a folding hold instruction in a device including a first panel and a second panel, the method comprising:
  displaying an e-book on the first panel and the second panel of the device;
  determining movement of at least one of the first panel and the second panel;
  determining whether a relative angle between the first panel and the second panel is within an effective angle range;
  determining whether the relative angle within the effective angle range is maintained during an effective time; and
  executing different functions according to the determined movement and an additional input including one of a touch on a screen of the device and a press of a function button included on the device within the effective time,
  wherein executing the different functions comprises changing a chapter including a current page of the displayed e-book to a next chapter if the first panel is moved to enter the effective angle range, and the additional input is input.

31. The method of claim 30, wherein executing the different functions comprises executing a function for selecting a detailed page of the displayed e-book if the second panel is moved to enter the effective angle range, and a touch of the second panel or the press is input.

32. The method of claim 31, wherein executing the function for selecting the detailed page comprises displaying a popup window for showing a page displayed on the second panel and a line indicating the page.

33. The method of claim 32, wherein executing the function for selecting the detailed page comprises directly moving the displayed page to a desired page by dragging the line in a left direction or a right direction, and displaying the desired page.

34. The method of claim 30, wherein executing the different functions comprises executing a function for changing a current e-book being displayed on the first panel and the second panel to a next e-book included in an e-book list if the first panel and the second panel are moved to enter the effective angle range, and the touch of the second panel or the press is input.

* * * * *